INVENTORS
EUGENE F. SAUNDERS
CHARLES A. SAUNDERS
BY
Kegan, Bellamy & Kegan
ATTYS.

INVENTORS
EUGENE F. SAUNDERS
CHARLES A. SAUNDERS
BY Kegan, Bellamy & Kegan
ATTYS.

INVENTORS
EUGENE F. SAUNDERS
CHARLES A. SAUNDERS
BY
Kegan, Bellamy & Kegan
ATT'YS.

INVENTORS
EUGENE F. SAUNDERS
CHARLES A. SAUNDERS
BY
Kegan, Bellamy & Kegan
ATTYS.

PHOTO-ELECTRICALLY DIRECTED SELF-PROPELLED WHEEL-SUPPORTED DEVICE

Filed June 27, 1962 8 Sheets-Sheet 5

INVENTORS.
EUGENE F. SAUNDERS
CHARLES A. SAUNDERS
BY
Kegan, Bellamy & Kegan
Att'ys.

Nov. 16, 1965 E. F. SAUNDERS ETAL 3,218,461

PHOTO-ELECTRICALLY DIRECTED SELF-PROPELLED WHEEL-SUPPORTED DEVICE

Filed June 27, 1962 8 Sheets-Sheet 6

INVENTORS
EUGENE F. SAUNDERS
CHARLES A. SAUNDERS
BY
Kegan, Bellamy & Kegan
ATTYS.

PHOTO-ELECTRICALLY DIRECTED SELF-PROPELLED WHEEL-SUPPORTED DEVICE

Filed June 27, 1962 8 Sheets-Sheet 7

INVENTORS
EUGENE F. SAUNDERS
CHARLES A. SAUNDERS
BY
Kegan, Bellamy & Kegan
ATT'YS INVENTORS
EUGENE F. SAUNDERS
CHARLES A. SAUNDERS
BY
Kegan, Bellamy & Kegan
Att'ys.

United States Patent Office 3,218,461

Patented Nov. 16, 1965

3,218,461

PHOTO-ELECTRICALLY DIRECTED SELF-PROPELLED WHEEL-SUPPORTED DEVICE

Eugene F. Saunders and Charles A. Saunders, both of Box 102, Columbus, Nebr.

Filed June 27, 1962, Ser. No. 205,640
29 Claims. (Cl. 250—202)

This invention relates to an automatic automotive unit and more particularly to a device adapted for traversing a predetermined route in accordance with certain photo-electrically induced signals.

In the described embodiment, the invention is illustrated in terms of the structural and electrical circuit means incorporated in a target-carrying automotive device which is adapted upon signal to follow a color coded pattern whereby the device may be energized to travel along a predetermined route from a given starting point to any one of a series of multiple stop points a predetermined distance therefrom. The device is automatically driven, steered and braked, in response to photo-electrically induced signals, and means are provided for reversing the direction of travel of the device whereby it may be returned to its initial starting point. In this manner an archer may signal the tangent device to travel from an archer's line position to a shooting line position, may fire his arrows at the target, and may then signal the device to return to the archer's line position so that the arrows implanted in the target may be readily removed therefrom.

The invention comprises the following features. A pulsation light source is utilized as the start signal means. A two-speed drive or slow-down arrangement is predicated upon switch means carried by the device which are responsive to the passage of the device over a positioned extension bar in the predetermined path of travel. A combination braking and controlling system is provided in the form of a rotating shaft unit which actuates a mechanical pulley belt frictional drag brake and which provides for the reversal of the drive sequence. Photo-electrically sensitive balance circuitry is provided to activate the steering means. A color coded pattern is positioned on the path of travel of the device whereby photo-electrically induced signals to actuate the steering means and the braking means are provided. In addition to the structural and electrical circuitry means adapted to accomplish the aforementioned functions, the invention comprises a novel charging circuit conveniently incorporated into the device in order to charge the self-contained battery means thereof.

Accordingly, it is an object of this invention to provide a self-propelled automatic control system for traversing a predetermined route and, in a more specific illustration, a target-carrying automotive device which responds to photo-electrically induced signals and to sequential and predetermined automatically induced switch action.

It is a further object of this invention to provide novel starting, drive, steering, slow-down, braking, and multiple stop means, in an automatic self-propelled device.

It is a related object of this invention to provide braking and controlling means predicated upon the rotary sequence of a revolving shaft which rotates in accordance with the movement of the automatically self-propelled device and upon a frictional drag means imparted to a drive shaft of the device by an eccentrically mounted pulley belt.

It is yet another object of this invention to provide novel battery charging means which may conveniently be incorporated into such an automatic self-propelled device in order to charge the self-contained battery means thereof.

It is yet another object of this invention to provide an automatically self-propelled device which will, upon signals, travel from a given starting point to another point a predetermined distance therefrom and which will, upon signals, return to the initial starting point.

These and other objects, features, and advantages of the subject invention will hereinafter appear, and, for purposes of illustration, but not of limitation, an exemplary description of the invention is contained in the appended drawings, in which.

Figure 9:
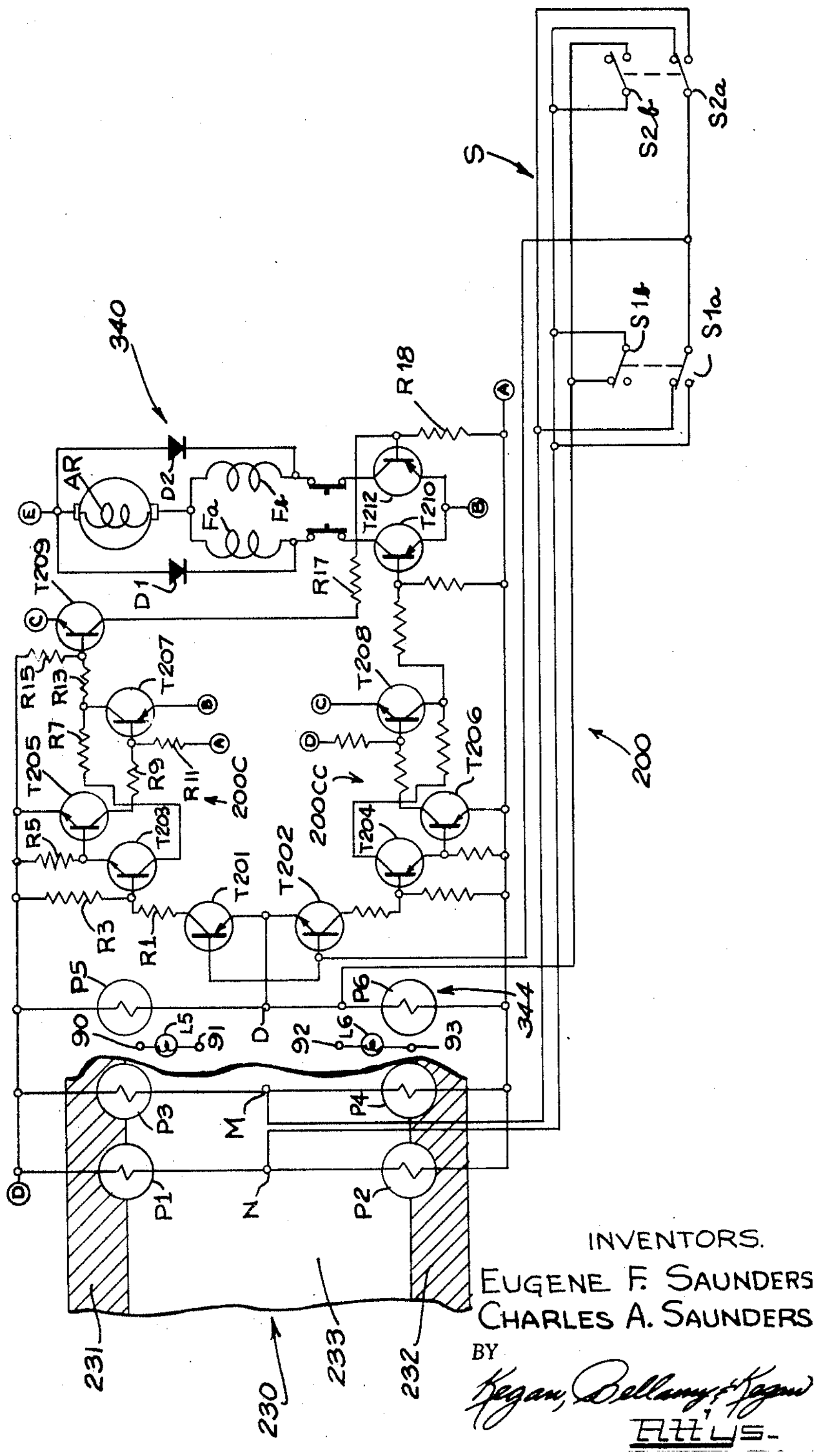
FIGURE 9 is a similar schematic circuit diagram of portions of the circuitry, showing the steering circuit and a part of the guide tape of FIGURE 1 for an understanding of the functioning thereof with respect to the steering control.
Figure 10:
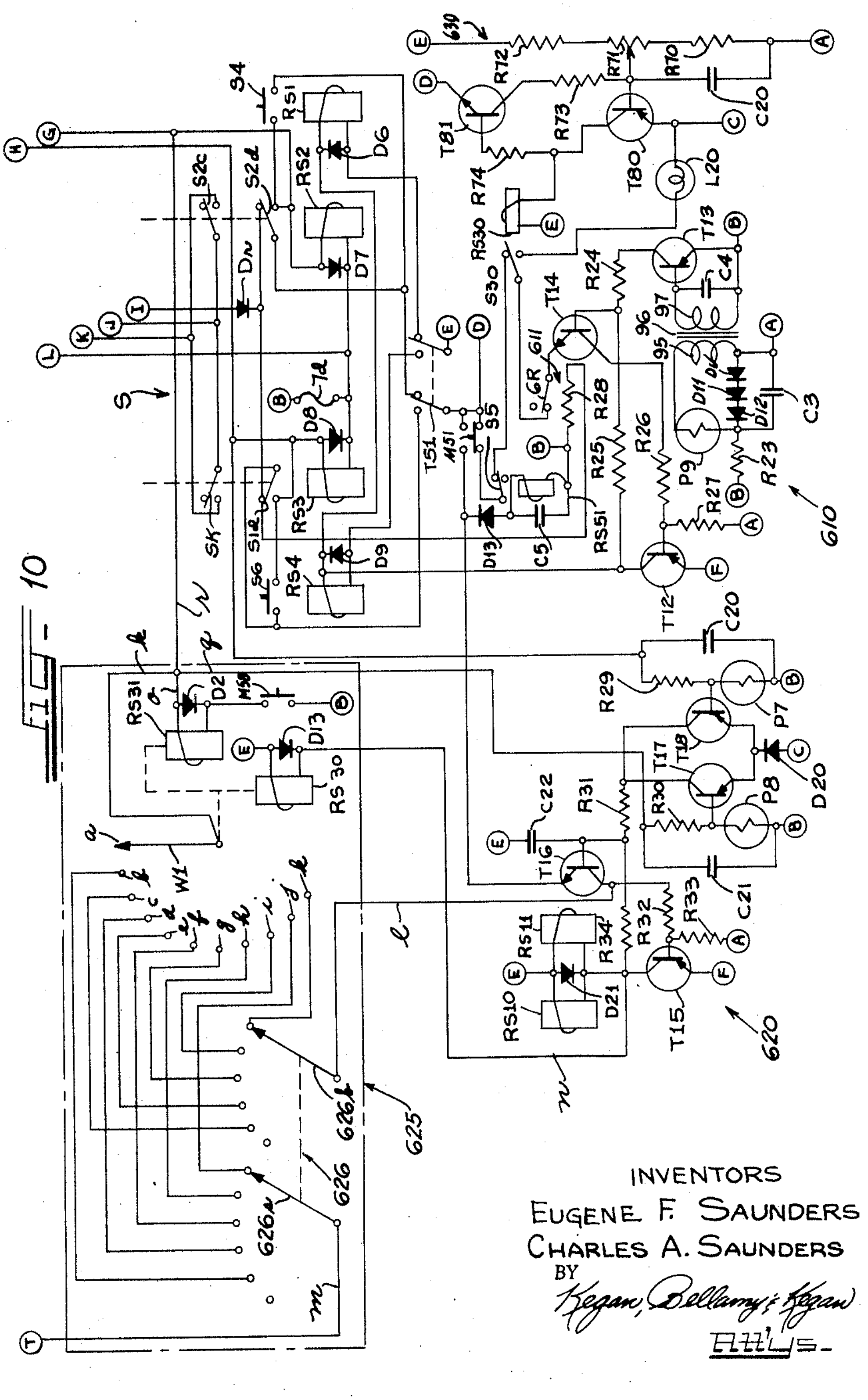
FIGURE 10 is a similar schematic circuit diagram of portions of the circuitry, showing the start circuitry, the reversing means which are controlled by the braking and controlling system of FIGURES 3–6, the brake circuitry, and one embodiment of a multiple stop circuitry arrangement.
Figures 11, 12, 13, 14:
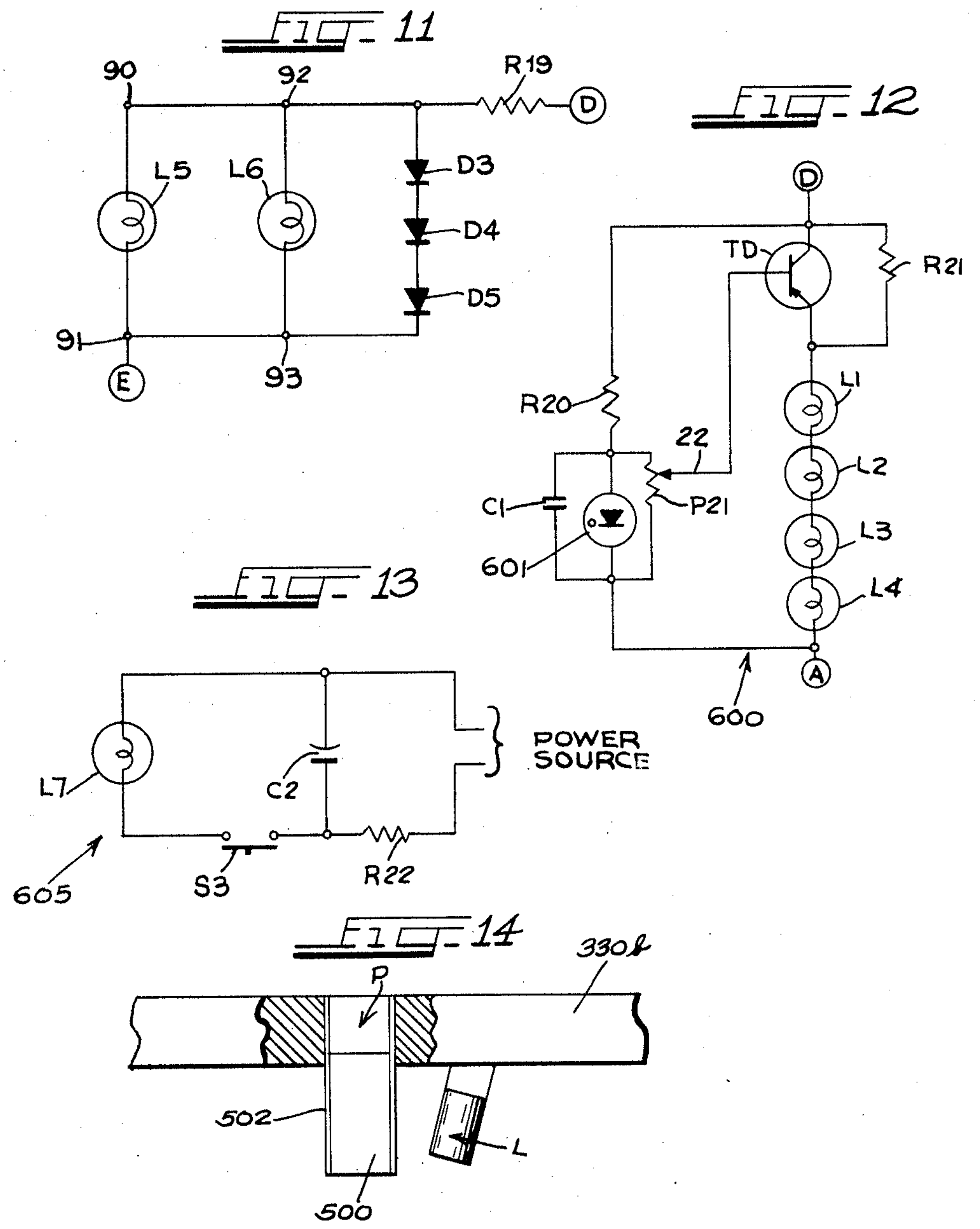
FIGURE 11 is a schematic circuit diagram showing details for the energization of the control lamps used in the photosensitive potentiometer bridge 344 of FIGURE 9.
FIGURE 12 is a schematic circuit diagram, showing details for the energization of the control lamps utilized in the forward and rearward photosensitive balance detecting bridges comprising respectively the photosensitive devices P1, P2 and P3, P4, as shown in FIGURE 9.
FIGURE 13 is a schematic circuit diagram, showing details for the energization of the pulsation start lamp to which the start circuitry of FIGURE 10 is responsive.
Figure 15:
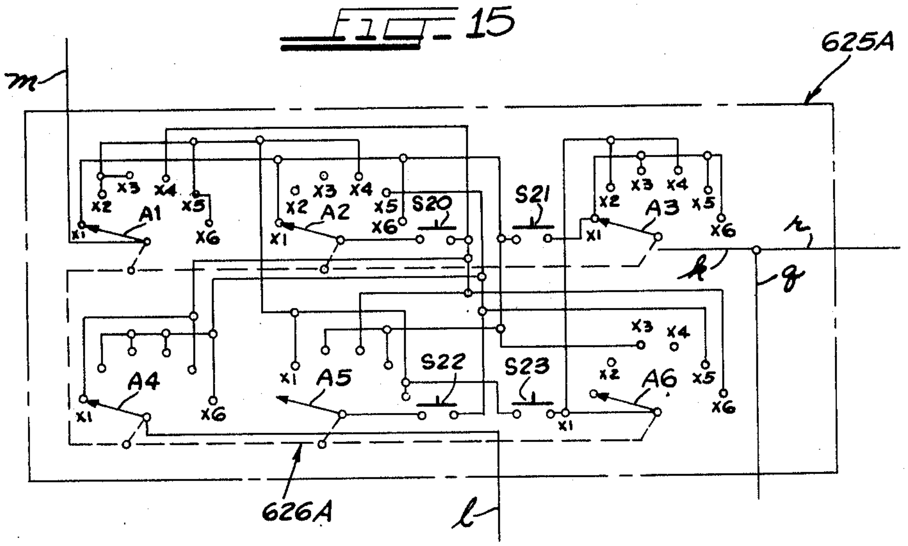

FIGURE 14 is a schematic representation of the mounting arrangement for a typical photo-sensitive device and its attendant control lamp, such as the photo-sensitive device P1 utilized in the steering control shown in FIGURE 9; and FIGURE 15 is a schematic circuit diagram, showing an alternate embodiment of the multiple stop circuitry which may be substituted for the multiple stop circuitry arrangement shown in FIGURE 10.

*Mechanical details (FIGURES 1 and 2)*

Figures 1, 7:
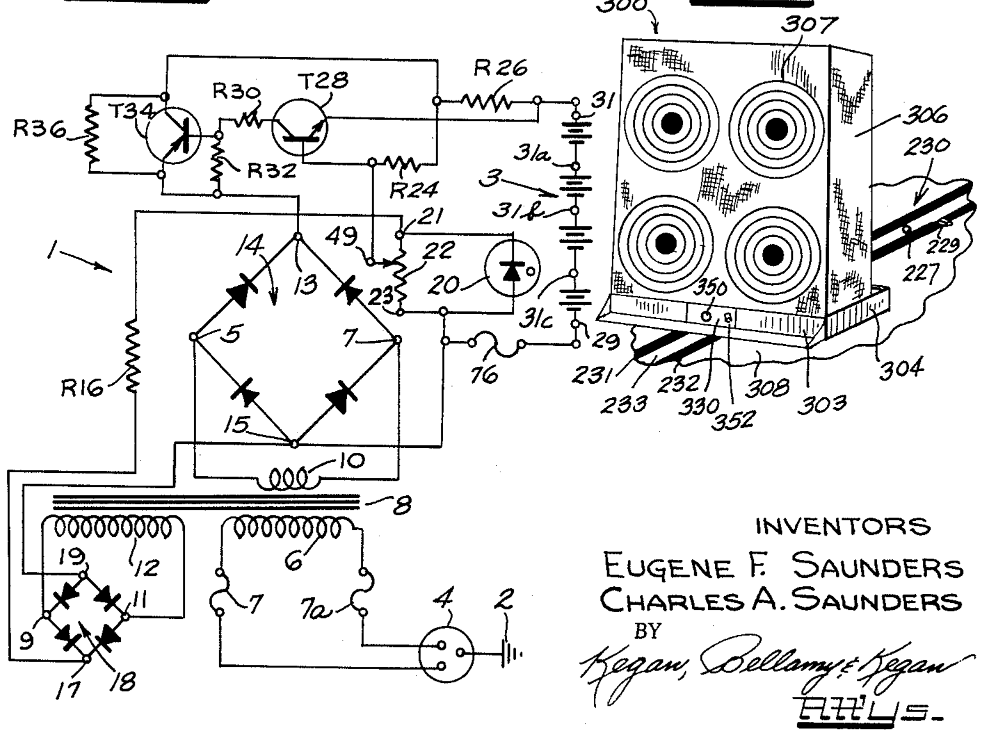
FIGURE 1 is a schematic view of a target-carrying automatically self-propelled cart shown positioned on a color coded pattern comprising a guide tape.
FIGURE 7 is a schematic circuit diagram of the battery charging circuit, which may conveniently be incorporated in the drive means shown in FIGURE 2, as for instance in the battery charging circuit box 348 thereof.

In the drawings, a self-propelled automatic truck 300 is shown pictorially in FIGURE 1. The truck comprises drive means 302 (see FIGURE 2) hidden beneath the drive curtain 304 and under a conventional target portion 306 having appropriate bull's eye target faces 307 thereupon. If desired, the target portion 306 may be of the improved type described in C. A. Saunders patent application, entitled "Improved Archery Target," Ser. No. 194,581, filed May 14, 1962. An arrow scoop 303 is provided on the front or target face of the truck 300. The truck 300 is adapted to travel back and forth along the floor 308 automatically in response to given predetermined signals.

In the described embodiment, the drive means 302 is designed to follow a floor tape 230 (see FIGURES 1 and 9) having appropriately coded colors and positioned extension bars thereupon to direct the starting, driving, steering, stopping, and reversing of the truck 300, as desired. Although other code references could obviously be utilized in developing a self-propelled automatic truck (as for example, a reference wire embedded in the floor), the colored floor tape system is preferred in that it need not be permanently affixed to the floor and may be readily changed or moved to suit the exigencies of a given operation. Of course, since color differentials are utilized for the automatic control of the truck 300, a separate tape 230 need not necessarily be provided, since the floor may be readily painted to provide the same appearance and thus the same effect as a tape.

As shown schematically in FIGURES 1 and 9, the tape 230 may comprise a white central portion 233 bordered on either side by black marginal portions 231 and 232. Contrasting color portions are appropriately provided on the tape 230, such as the black dot 227 on white central portion 233, as code signals for the circuitry of the drive means 302, in a manner to be subsequently described. Likewise, a positioned extension bar, such as the element 229, may be affixed to the tape so as to appropriately trip a conventional microswitch, in a manner to be subsequently described.

The mechanical structure of the drive means 302 comprises a box frame 310 having pillow block bearings 312 and 312*a* affixed thereon. A drive shaft 314 is rotatably journalled in respective bearings 312 and 312*a*. Drive wheels 316 and 316*a* are mounted for fixed rotation on the drive shaft 314. A rubber shock absorber 320 positions the drive motor 318 which, through the flexible coupling 322, drives the roller chain 324 thereby to turn the shaft 314 and the wheels 316 and 316*a* mounted thereupon.

Batteries 326 and 326*a* are positioned adjacent the rear of the frame 310 to supply the energy for the drive means 302. The switch and fuse box assembly 328 is positioned on the frame 310 between the batteries 326 and 326*a*. A circuitry box 330, containing the novel sensing and directing systems of the instant invention, is positioned midway of the frame 310 adjacent the bottom thereof.

Steering wheels 332 and 332*a* are provided adjacent the front or target line side of the frame 310. The wheels 332 and 332*a* are respectively rotatably journalled on the steering arms 334 and 334*a* which are joined by the paralleling and bracing linkage bar 336. A steering cable 338 is attached at its opposite ends to the arms 334 and 334*a* and is fixedly looped or trained about the drive shaft of the reversible steering motor 340. The fixed bighting attachment of the cable 338 is provided so that the steering motor 340, when appropriately energized, will rotate in a given direction and will parallelly rotate the arms 334 and 334*a*, thereby to turn the steering wheels 332 and 332*a*. The fixed bighting attachment prevents slippage of the cable 338 during the described rotational movements.

The box 342 houses a photo-sensitive potentiometer bridge 344 for sensing a mechanical deflection of the linkage bar 336 relative to the circuitry box 330. The bridge 344 (hereinafter described in detail and shown only schematically in FIGURE 2) comprises a pair of lamps positioned respectively adjacent a pair of photo-sensitive devices coupled in series connection. Movement of the linkage bar 336 relative to the circuitry box 330 is thus indicated by an increased reception of light by one of the photo-sensitive devices and a decreased reception of light by the other, whereby an electrical signal is generated to indicate the extent of deflection of the linkage bar 336 (and therefore of course to indicate the extent of deflection of the steering wheels 332 and 332*a*).

A brace 345 affixed to the frame 310 supports braking and controlling assembly 400 (hereinafter described in detail). A battery charging circuit box 348 is positioned adjacent the front of the frame 310 and may contain the battery charging circuitry (hereinafter described in detail).

Examples of the actual mechanical embodiments of the circuitry elements contained within the circuit box 330 include a start-up photo-electric device 350 and a safety microswitch 352 each positioned adjacent the front of the circuit box 330. Support bars 354, 354*a*, and 354*b* are also provided adjacent the front of the frame 310 to brace the arrow scoop 303 on the front of the curtain 304, as shown in FIGURE 1.

*Battery charging circuitry (FIGURE 7)*

Figure 8:
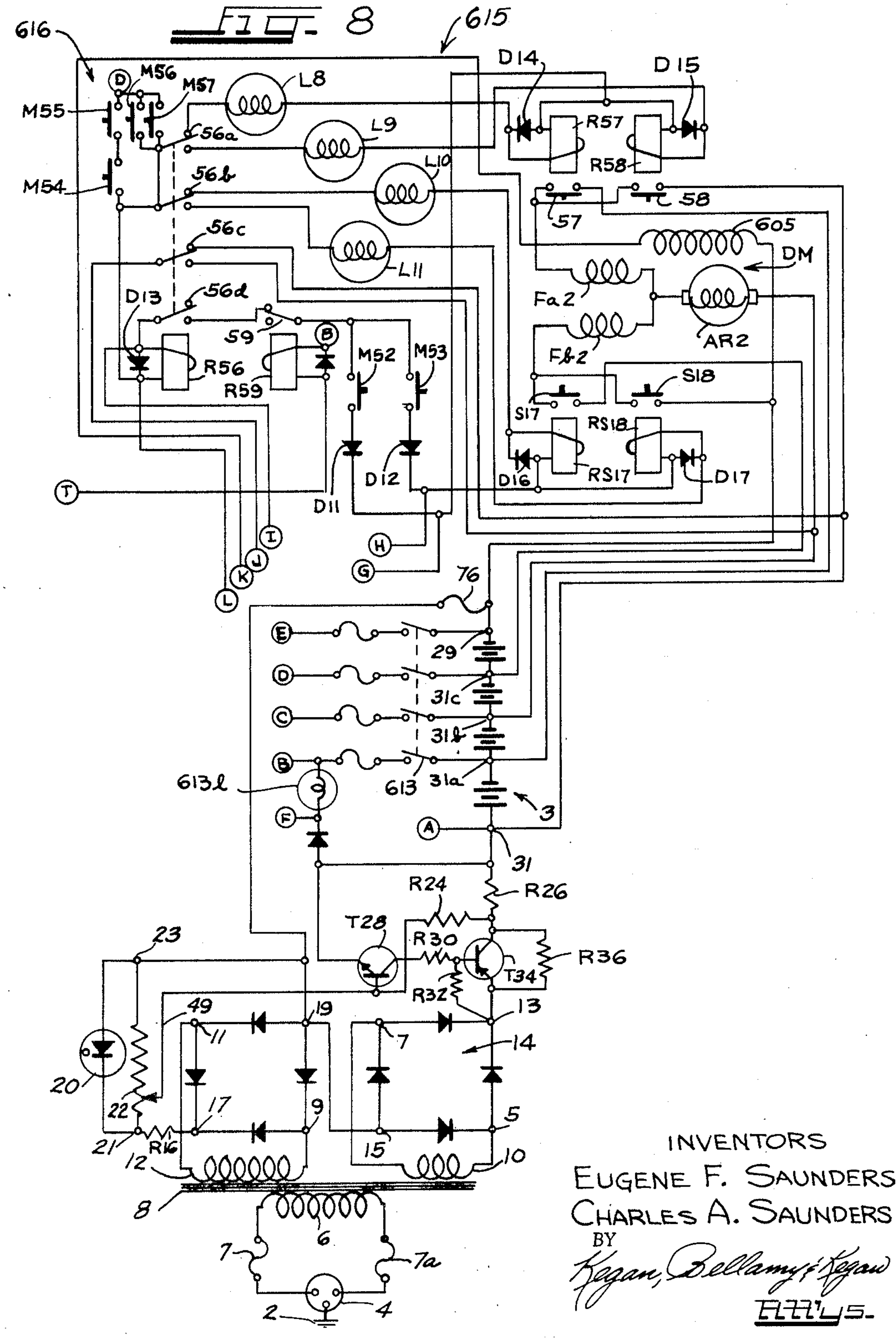
FIGURE 8 is a schematic circuit diagram of portions of the circuitry which is contained in the circuit box 330 of the drive means of FIGURE 2, showing the battery charging circuit of FIGURE 7, the battery means, and the two-speed drive and slow-down arrangement.

The battery charging circuitry 1 (see FIGURE 7) is designed to charge the D.C. battery 3 having a positive potential across the terminals 31 and 29 thereof designated as A–E in FIGURE 8. The circuitry 1 comprises a plug 4 adapted to receive A.C. power from a line source 2 and thus to energize the primary coil 6 of a transformer 8. Fuses 7 and 7*a* are provided in series with the primary coil 6 in a conventional manner.

The primary coil 6 energizes the secondary coils 10 and 12 across the transformer 8. The secondary coil 10 is connected to a full wave rectification bridge 14 across the terminals 5 and 7. The bridge 14 delivers a positive output voltage across the terminals 13 and 15. Similarly, the secondary coil 12 is connected via a series resistor 16 to a full wave rectification bridge 18 across the terminals 9 and 11. The bridge 18 delivers a positive output potential across the terminals 17 and 19.

Terminal 17 connects with terminal 21 and terminal 19 connects with terminal 23 thereby to impress the voltage output of rectification bridge 18 across the terminals 21 and 23. Potentiometer 22 is connected between terminals 21 and 23, and a voltage reference source 20 is connected in parallel therewith between terminals 21 and 23.

The voltage reference source 20 may be a Zener diode which breaks down and conducts at a given voltage (dissipating the excess voltage over the given breakdown value across the resistor 16) or any other conventional voltage regulating element. The potentiometer 22 is provided to adjust for manufacturing tolerances and variations in the voltage reference source 20.

The terminal 29 of battery 3 is connected via fuse 7*b* to terminal 23 of potentiometer 22. Thus, each of the terminals 19 of bridge 18, 15 of bridge 14, 23 of potentiometer 22, and 19 of battery 3 are all at the same negative potential.

Terminal 13 of bridge 14 connects to the emitter of PNP transistor T34. Terminal 13 also connects to the base of transistor T34 via series resistor R32 and to the collector of NPN transistor T28 via series resistors R32 and R30.

The collector of transistor T34 connects to terminal 31 of battery 3 via series resistor R26 and to the base of transistor T28 via series resistor R24.

The base of transistor T28 is also connected to potentiometer 22 via potentiometer variable tap 49. The emitter of transistor T28 is short connected to terminal 31 of battery 3.

The operation of the battery charging circuit 1 is as follows: When a battery charging unit employing the circuit 1 is plugged in, the output potentials of the bridges 14 and 18 are impressed within the circuit as noted. However, the output potential of bridge 18 can never rise above the given fixed voltage reference value by virtue of the presence of the voltage regulating source 20. Also, the output voltage of bridge 14 (which is actually the charging voltage for the battery 3) is chosen such that it is significantly greater than the potential of the battery 3.

In this fashion, it is apparent that the transistor T28 will conduct only if its base is more positive than its emitter. When transistor T28 does conduct, transistor T34 also conducts (the potential at terminal 13 always being more positive than the potential at terminal 31 of the battery 3) since current flow from terminal 13 of bridge 14 to the collector of transistor T28 induces current flow to the base of transistor T34, and the emitter of transistor T34 is at a higher potential than the base thereof by virtue of the potential drop across resistor R32. Thus, transistor T28, when appropriately energized, switches on transistor T34, which in turn effectively impresses the output voltage of bridge 14 across the battery 3 and locks on transistor T28 because of the voltage drop across R26 which is impressed onto the base of T28 via resistor R24 causing T28 and T34 to be a self-locking circuit.

However, since the charging of battery 3 commenced only when the potential across the potentiometer 22 was greater than the potential across the battery 3, whenever these potentials are equal, the charging will not commence. Of course, the charging, even when the potentiometer potential is greater than the battery potential, commences *n* times per second, when *n* equals the frequency of the sinosoidal full wave rectification voltage curve, that is, the charging current by virtue of the transistor T28 alone will turn on and off *n* times per second. However the transistor T34 serves to smooth out the rectified current since it is also triggered by the transistor T28. Furthermore, even when the transistor T28 is not conducting (and therefore the transistor T34 is not conducting), a small trickle charge will be impressed onto the battery 3 via the shunt resistor R36 of the transistor T34 and the series resistor R35 connecting terminal 13 of bridge 14 to terminal 31 of the battery 3. However, where a trickle charge is not desired, the resistor R36 may be conveniently displaced or open circuited.

*Braking and controlling system (FIGURES 3–6)*

Figure 2:
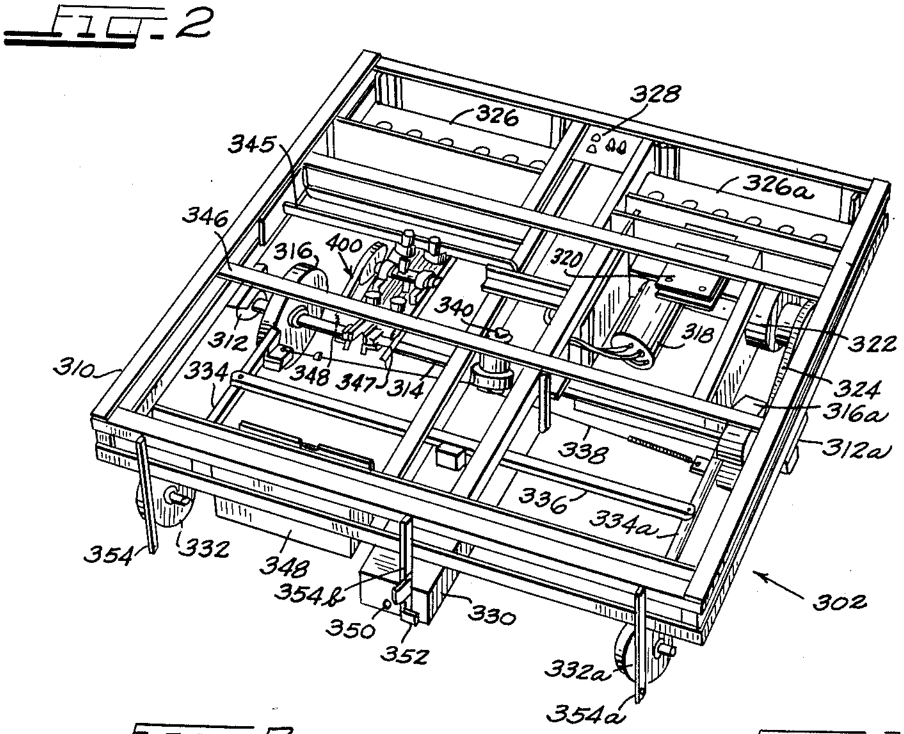
FIGURE 2 is a pictorial perspective view of the drive means contained in the cart shown in FIGURE 1.

FIGURES 3 through 6 show details of the novel braking and controlling system 400 shown in FIGURE 2 as mounted on the truck drive means 302 between the cross-bracing members 345 and 346. The system 400 comprises two parallelly aligned side L-bars 401 and 403 which are cross braced at their respective ends by two parallelly aligned end L-bars 405 and 407. Conveniently, the end L-bars 405 and 407 may be welded to the respective ends of the side L-bars 401 and 403 to form a generally rectangular frame for the system 400.

Figures 3, 6:
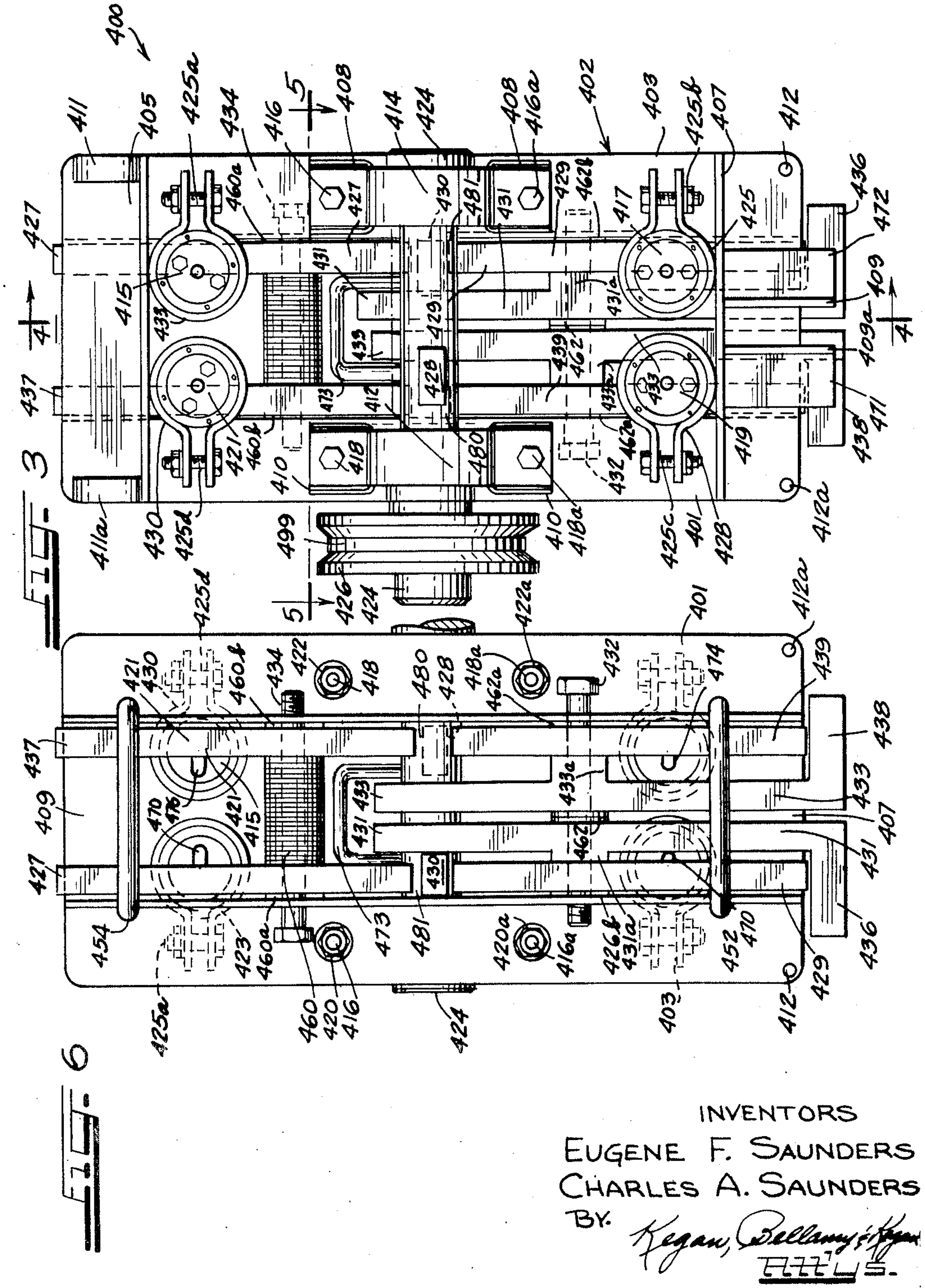
FIGURE 3 is a top plan view of the braking and controlling system which forms a part of the drive means shown in FIGURE 2.
FIGURE 6 is a bottom view of the structure shown in FIGURE 3.

Mounting brackets 409 and 409*a* are positioned on the end L-bar 407 to mount a plurality of conventional microswitches, such as the microswitches 471 and 472 (see FIGURE 3). Annular cylindrical plugs 411 and 411*a* are mounted on the end L-bar 405 to provide a bearing support for mounting of the system 400 onto the cross brace 345 of the truck drive means 302. Preferably, the plugs 411 and 411*a* are adjustably connected to the end L-bar 405 whereby the tension on the pulley belt 499 (hereinafter described) may be tightened as desired. Similarly, springs 347 and 348 (see FIGURE 2) are provided for attachment respectively to the apertures 412 and 412*a* (see FIGURES 3 and 6) for a free-floating support of the system 400 adjacent the cross-bracing member 346 of the truck drive means 302.

Channel spacers 404 and 406 are each positioned respectively on the side L-bars 403 and 401. Bottom U-shaped channel bearing sleeves 408 and 410 are each positioned respectively on top of the spacers 404 and 406. Top generally U-shaped bearing sleeves 412 and 414 are each positioned respectively on top of the bottom channel bearing sleeves 410 and 408. Bolts 416 and 416*a* pass through the top bearing sleeve 414, the bottom bearing sleeve 408, the spacer 404, and the side L-bar 403 and maintain these elements in the illustrated position by virtue of the respective nut attachments of nut 420 to bolt 416 and nut 420*a* to bolt 416*a*. Similarly, the bolts 418 and 418*a* interjoin the top bearing sleeves 412, the bottom bearing sleeve 410, the spacer 406, and the side L-bar 401 by virtue of the nut attachments of nut 422 to bolt 418 and nut 422*a* to bolt 418*a*.

A shaft 424 is rotatably journalled in the bearing sleeves 408, 414 and 410, 412. An eccentrically mounted pulley sheath 426 (see FIGURE 5 for illustration of the eccentricity) is fixedly mounted on the rotatable shaft 424 for rotation therewith. Likewise, lever arms 428 and 430 are each positioned on opposite 180° spaced sides of the shaft 424 for rotation therewith.

Four levers (427 and 429 associated with arm 430 of shaft 424 and 437 and 439 associated with arm 428 of shaft 424) are mounted intermediate the end L-bars 401 and 403 as follows: A bolt 432 passes through side L-bar 401, lever 439, lever 429, and side L-bar 403. Similarly, a bolt 434 passes through side L-bar 403, lever 427, lever 437, and side L-bar 401. Appropriately positioned washers, such as the washers 460, 460*a*, and 460*b*, are utilized to define a fixed position for the levers 427 and 437 in parallel alignment adjacent the respective side L-bars 403 and 401. Similarly, washers, such as the washers 462, 462*a*, and 462*b*, are provided to mount the parallelly aligned levers 429 and 439, but, in this instance, additional elements are provided intermediate the two levers 429 and 439. These additional elements are the cam followers 431 and 433 having the end finger extensions 436 and 438 (as best seen in FIGURE 6). The cam followers 431 and 433 may have built-in extension flanges 431*a* and 433*a* to provide the desired spacing of the lever elements contained on the bolt 432.

The levers 427 and 437 are loosely mounted on the bolt 434 such that these levers may rotate with respect thereto. Similarly, the levers 429 and 439 as well as the cam followers 431 and 433 are loosely mounted on the bolt 432 such that these elements may rotate with respect thereto. Cross-bracing U-shaped members 452 and 454 are provided between the side L-bars 401 and 403 to limit the amount of rotation which the elements 429, 431, 433, and 439 on the one side and 427 and 437 on the other side may achieve. In other words, the levers 427 and 437 are mounted for rotation on the bolt 434 between extreme positions of contiguous contact with the cross brace 454 at the one extreme and of contiguous contact with the end L-bar 409 at the other extreme. Similarly, the levers 429 and 439 and the cam followers 431 and 433 are mounted for rotation on the bolt 432 between extreme positions contiguous with the cross brace 452 at the one extreme and contiguous with the end L-bar 407 at the other extreme.

Solenoids 415, 417, 419, and 421 are mounted in the system 400 such that each such solenoid upon energization causes the previously described rotative movement of the levers 427, 429, 439, and 437 respectively from one of their extreme rotative positions to the other. The solenoids are each positioned in the system 400 by generally U-shaped mounting brackets 423, 425, 428, and 430 respectively. The mounting brackets 423 and 430, which position the solenoids 415 and 421 respectively, are affixed to the system 400 as by welding to the end L-bar 405. Similarly, the mounted brackets 425 and 428, which position the solenoids 417 and 419 respectively, are affixed to the system 400 as by welding to the end L-bar 407. Nut and bolt mounting assemblies *425a*, *425b*, *425c*, and *425d* are respectively utilized to clamp the U-shaped brackets 423, 425, 428, and 430 about the solenoids 415, 417, 419, and 421. Plunger arms 470, 472, 474, and 476 are respectively associated with each of the solenoids 415, 417, 419, and 421 and are each pin-locked in the respective levers 427, 429, 439, and 437, whereby energization of any of the solenoids 415, 417, 419, or 421 will cause the plunger arm associated therewith to pull in towards the solenoid in order to rotate the associated levers as desired.

Figure 4:
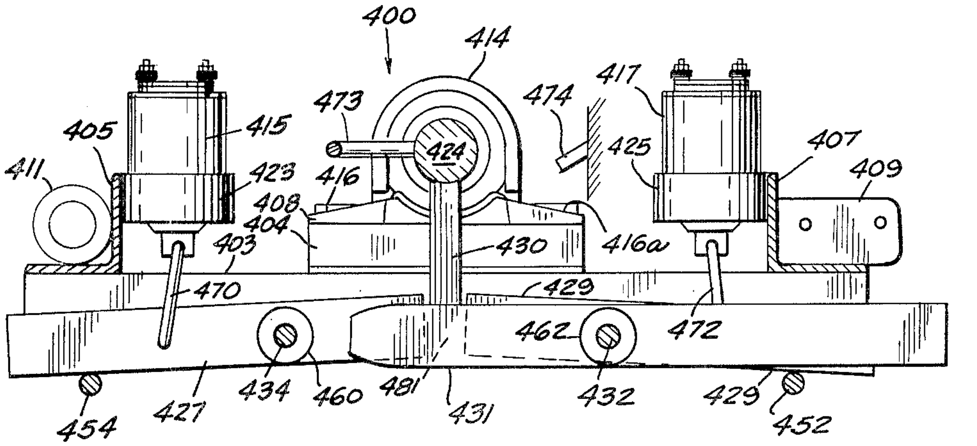
FIGURE 4 is a side sectional view of the structure shown in FIGURE 3, taken along the lines 4—4 of FIGURE 3.

In greater detail (as best seen in FIG. 4), the levers are cantilever loaded about their respective fulcrum points on the bolts 432 and 434 such that they are normally gravity biased in the positions shown in FIGURE 4, that is, for example such that the levers 427 and 437 rest upon the cross brace 454 while the levers 429 and 439 rest upon the cross brace 452. Similarly, the cam followers 431 and 433 are correspondingly cantilever loaded so that they normally rest upon the cross brace 452 by virtue of gravity induced bias.

In this fashion, it should be apparent that as the arm 428 of the shaft 424 rotates about to its lower-most position, it will become locked in the space 480 intermediate the ends of the levers 437 and 439, and correspondingly as the arm 430 of the shaft 424 rotates about to its lowermost position it will become locked in the space 481 intermediate the ends of the levers 427 and 429 (see for example FIGURES 4 and 6). The respective lever arms 428 and 430 will lock into these positions because as they approach their lowermost position (depending upon the direction) they will depress the first lever arm that they strike by a cam effect, but, after the arm 428 and 430 passes into the region 480 or 481 respectively, the lever which was cammed downwardly will snap back up to its normal gravity biased position, and the lever arm 428 or 430 will be prevented from further movement in either direction by virture of the impedance of the ends of the respective levers on either side thereof.

Simultaneously, as the arm 430 approaches and becomes locked in its lowermost position at 481, it will depress the cam follower 431 from its normal gravity biased position so as to raise the end finger extension 436 thereof (see FIGURE 4); and correspondingly, as the arm 428 approaches and becomes locked in its lowermost position at 480, it will depress the cam follower 433 from its normal gravity biased position so as to raise the end finger extension 438 thereof (see FIGURE 4).

Figure 5:
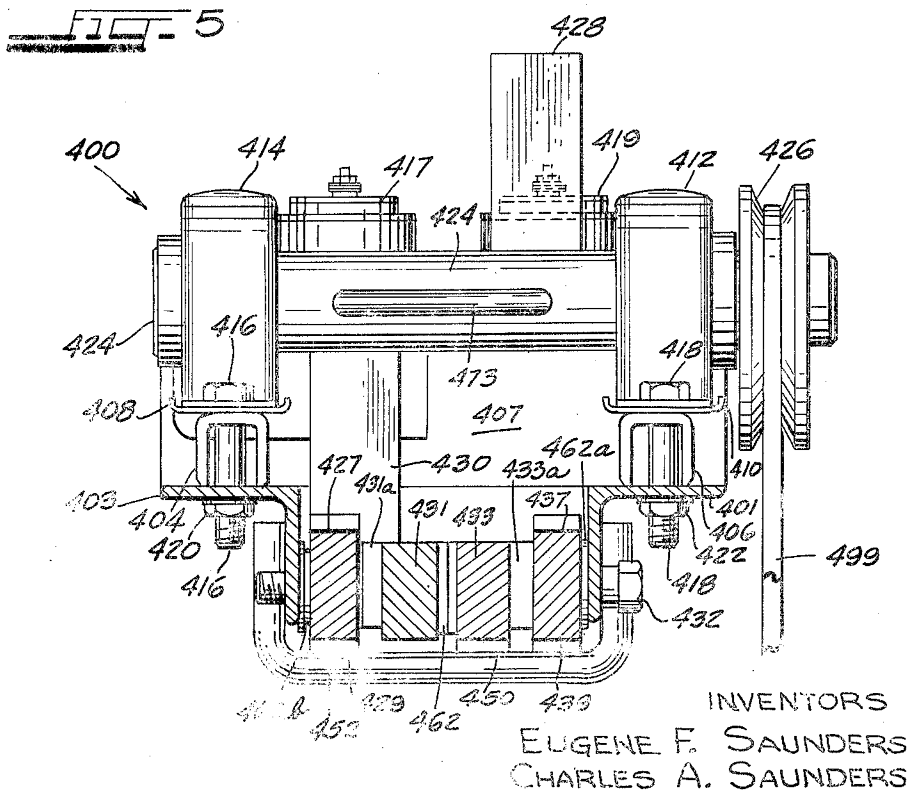
FIGURE 5 is a front sectional view of the structure shown in FIGURE 3, taken along the lines 5—5 of FIGURE 3 and showing the eccentricity of the pulley sheath of the braking and controlling system.

The operation of the braking and controlling system 400 may be appreciated from the following cyclic description:

As may be appreciated from FIGURE 5, whenever the arm 430 is in its lowermost position (and of course the arm 428 will then be in its uppermost position), the pulley sheath 426 will be eccentrically orientated such that the distance from the axis of the shaft 424 to the circumference of the sheath 426 will be a minimum. Conversely, when the arm 428 is in its lowermost position (and of course the arm 430 will then be in its uppermost position), the pulley sheath 426 will then be eccentrically orientated such that the distance from the axis of the shaft 424 to the circumference of the sheath 426 will be a maximum.

A pulley belt 499 is trained about the sheath 426 and about a running drive shaft such that the pulley belt loosely travels about the sheath 426 when it is in the drive position of minimum eccentricity shown in FIGURE 5 and is tightly trained about the sheath 426 when it is in its reverse brake position of maximum eccentricity. Thus, by rotating the shaft 424 by 180° in either direction from the position shown in FIGURE 5, the pulley belt 499 trained about the sheath 426 and about a drive shaft (not shown) will be tightened by virtue of the movement of the eccentric pulley sheath 426 and, by appropriate dimensioning, the pulley belt can be caused to tighten sufficiently so as to provide a frictional drag or brake on the rotating drive shaft.

In cyclic operation, the following sequence of events may be observed:

Assume that the system 400 is in the position shown in FIGURES 4 and 5 with the pulley belt 499 rotating in a clockwise direction about the pulley sheath 426, that is, the shaft 424 as seen in FIGURE 4 rotates in a clockwise direction. Since the belt is trained loosely about the sheath 426, this is a free running position with no braking effect being observed, although the belt 499 is in sufficient contact with the sheath 426 to tend to rotate the sheath 426 in a clockwise direction. However, the shaft 424 is prevented from any such rotation since the lever arm 430 is locked in the space 481.

When the solenoid 415 receives a braking signal, it pulls up on the lever 427 via the plunger arm 470 such that the end of the lever 427 adjacent the space 481 no longer impedes the movement of the lever arm 430, which when free will rotate in a clockwise direction by virtue of the loose pulling of the pulley belt on the sheath 426. After the arm 430 has rotated 180°, the arm 428 will bear down onto its lowermost position and will lock in the space 480 intermediate the ends of the lever arms 437 and 439 while simultaneously depressing the cam follower 433 so as to raise the end finger extension 438 thereof to its uppermost position. The sheath 426 will now be in a braking or tight position of maximum eccentricity, and the pulley belt 499 will be tightened thereby such that a frictional drag is imposed for braking the drive shaft rotation.

When it is desired to start the rotation of the drive shaft again, in the opposite or counter-clockwise direction of movement, a start signal is sent to the solenoid 419 whereby the arm 428 is released from the space 480 and the shaft 424 rotates in a counter-clockwise direction for 180° until the arm 430 again locks in the space 481.

This, of course, is the free running position in the direction determinated by the pulley belt rotating in a counter-clockwise position.

When it is desired to brake this movement, an appropriate braking signal is delivered to the solenoid 417 whereby the arm 430 is released from the space 480 by virtue of depression of the impeding end of the lever 429. The shaft 424 will now rotate 180° in a counter-clockwise direction until the arm 428 is again locked in the 480 space.

For reversed direction travel once again after a complete braking stop, a start signal is delivered to solenoid 421 which releases the arm 428 for a clockwise rotation of the shaft 424 back to the original assumed free-running condition.

Thus, it should be appreciated that, depending upon the direction of movement of the pulley belt and therefore of the shaft 424, appropriate starting and braking signals may be delivered to the solenoids 415, 417, 419, and 421 whereby the shaft 424 rotates first one way and then the other through 180° angular deviations with either the arm 428 or the arm 430 locked in the spaces 480 and 481 respectively. The sequence repetitively follows the pattern of two successive 180° angular deviations in one given direction followed by two successive 180° angular deviations in the opposite direction. When the arm 428 is locked in the space 480, a braking position is defined; and, when the arm 430 is locked in the space 481, a running position is defined.

Obviously, a brake system such as the system 400 just described can be utilized as a control element by virtue of its known predetermined cyclic operations. Thus, as already indicated, the cam followers 431 and 433 are provided such that positioning of either the arm 428 or the arm 430 in the locking spaces 480 and 481 respectively can be simultaneously accompanied by a cammed depression of the cam followers 433 and 431 respectively whereby microswitches, such as the microswitches 472 and 471, may be triggered. Likewise, a U-shaped arm 473 may be provided extending from the shaft 424, for triggering a conventional reversing toggle switch 474, such as it shown schematically in FIGURE 4. In this manner, the rotational position of the shaft 424 can be utilized to position the toggle switch 474, as desired.

The detailed operation of the system 400, both with respect to its input signals for braking (to the solenoids 415 and 417) and for starting (to the solenoids 419 and 421) and with respect to the output signals derived therefrom by virtue of the mechanical interaction of the arms 428 and 430 with the cam followers 433 and 431 respectively and the U-arm 473 with the toggle switch 474, will be hereinafter interrelated to the circuitry of the automatic self-propelled truck 300 shown in FIGURE 1. However, the following phenomena should be observed at this point. A lever arm 430 down-lever arm 428 up position defines a free-running status whereas a lever arm 430 up-lever arm 428 down position defines a braking status. Likewise the U-arm 473 is positioned at a 90° angular phase with respect to the 180° separated lever arms 428 and 430. The shaft 424 exhibits sequence characteristics following the pattern, from an assumed halt or brake position, of: forward start signal followed by 180° rotation in a given direction; forward brake signal followed by 180° rotation in the same direction; reverse start signal followed by 180° rotation in the opposite direction; and reverse brake signal followed by 180° rotation in the same opposite direction. Therefore, it should be apparent that a reversing toggle switch, such as the switch 474, positioned with its neutral position 180° away from the free-running position of the U-arm (as shown in FIGURE 4), will be reversed just prior to the completion of the angular rotation attendant to a brake signal. Thus, the toggle switch 474 may be correlated with a reversible drive system such that the completion of a braking operation can be utilized to signal a desired reversal in drive sequence.

*Start circuitry (FIGURES 13 and 10)*

With reference to FIGURE 13, a start-up sub-circuit 605 is shown comprising a start-up lamp L7 connected in series with a switch S3 and a resistor R22 across a battery. A capacitor C2 is connected in parallel with the series combination of lamp L7 and switch S3. The value of the resistor R22 is chosen at a sufficiently high value such that for a 12 volt potential between the points R and S, as shown, the lamp L7 will not be lit even when the switch S3 is closed, that is, the current drawn through the lamp L7 will not be significantly appreciable such that the lamp L7 will light.

However, when the switch S3 is opened circuited, the series combination of resistor R22 and capacitor C2 will, in a conventional time constant manner, result in a charge of the capacitor C2 by virtue of the 12 volts potential across the resistor R22 and the capacitor C2 in series. Thus, when the switch S3 is depressed, the lamp L7 will flash brightly, not by virtue of a current draw through the resistor R22 and the lamp L7 in series, but rather by virtue of a current draw through the lamp L7 attributable to a discharge of the capacitor C2. Even if the switch S3 should be maintained in a closed position, the lamp L7 will not light for any longer than a relatively short term flash, since the previously described condition of insufficient current draw therethrough by virtue of the resistor R22 will be exhibited. Also, if the switch S3 is maintained in a depressed or closed condition, the lamp L7 will short circuit the capacitor C2 and, therefore, the capacitor C2 cannot possibly recharge unless and until the switch S3 is open. Once that event occurs, the capacitor C2 will again be charged such that a subsequent depression of the switch S3 will result in the described flash of the lamp L7.

The start-up subcircuit 605 shown in FIGURE 13 is thus provided because (as hereinafter described) the start circuitry is sensitive to a brief and bright pulsation of light and to no other light signal such as an accidental headlight of an automobile impinging upon the circuitry or any other stray light which may be present, such as sunlight. Moreover, since the circuitry is sensitive only to this brief pulsation and will not be affected by a continuously depressed switch S3, an operator attemping to purposely malfunction the apparatus will be unable to do so.

As an exemplary embodiment, a four-thousand microfarad capacitor rated at 12 volts may be utilized for the capacitor C2 and a resistance of 1,000 ohms may be utilized for the resistor R22 whereby an approximately four second time delay is achieved for a 2.25 volt ½ ampere rated lamp L7. Thus, under the exemplary conditions, the switch S3 must be opened for approximately four seconds for the capacitor C2 to become sufficiently charged so as to exhibit the desired discharge or pulsation onto the lamp L7 once the switch S3 is depressed.

With reference to FIGURE 10 the start circuitry generally designated as 610 comprises the series combination of three diodes D10, D11, and D12 in series with a resistor R23 between the reference points A and B (i.e., a 6 volt potential drop under the assumed battery conditions of 6 incremental volts per terminal of a 24-volt battery). Since the diodes D10, D11, and D12 are chosen to have an approximate ¾ volt potential drop across each unit, approximately 2.25 volts across the trio of diodes will be evidenced. The resistor R23 dissipates heat for the remaining potential of A–D, that is, the six volts across A–D minus the approximately 2.25 volts across the diodes D10–D12. The capacitor C4 is provided in parallel with the trio of diodes D10–12 for transient purposes, that is, regardless of fluctuations in the potential A–B, the capacitor C2 will dampen out any variations across the diodes D10–D12 such that a relatively fixed value of about 2.25 volts is continuously maintained thereacross.

This voltage across the diodes D10–D12 is impressed across a series combination comprising the photosensitive device P9 in series with the primary winding 95 of the transformer 96 shown in FIGURE 10.

The photosensitive device P9 is exposed to a relatively constant light source, namely, the ambient light conditions at the location of the cart. However, when the lamp L7 of FIGURE 13 emits its relatively brief and bright pulsation of light, this light is directed against the photosensitive device P9 whereby the resistance of P9 is lowered such that a change in current is exhibited through the primary winding 95 (the voltage source, namely the potential across the diodes D10–D12, being of fixed value). The transformer 96, which of course is only sensitive to changes in current flow, will now transform energy to the secondary winding 97 which will also exhibit a varying current characteristic.

The schematic photosensitive device P9 shown in FIGURE 10 corresponds to the mechanical photosensitive device 350 shown at the front of the circuitry box 330 in FIGURE 2. In other words, the lamp L7 of FIGURE 13 is positioned to focus upon the photosensitive device P9 or its mechanical equivalent designated as 350 on the truck drive means 302, whereby depression of the switch S3 (see FIGURE 13) will result in a pulsation of light to give the start signal to the automatic truck 300.

The varying current induced in the secondary winding 97 will, at a given and predetermined value, exhibit a resonant frequency potential across the capacitor C4 at the resonant frequency determined by the LC circuit of the capacitor C4 and the inductor winding 97. When this resonant frequency is achieved, the potential across the capacitor C4 will be reflected on the base of the transistor T13, whereby the transistor T13 will be turned on to allow current flow from reference point B through transistor T13 and resistor R24 in series therewith to the base of transistor T14.

When transistor T14 is thus triggered, current flow may be traced from reference point A through the series combination of resistors R27, R26, and transistor T14 (in a manner to be subsequently described). However, current flow through the resistors R27 and R26 will in turn trigger the transistor T12 since the base thereof is connected in between the resistors R27 and R26. Current will now flow from reference point F through the transistor T12 in series with the resistor R25 to the base of the transistor T14.

In other words, the transistor T13 is switched on for a relatively brief instant when resonant frequency is achieved in the parallel combination of secondary winding 97 and capacitor C4 in response to a pulsation of light from lamp L7. Thereby, transistor T14 is turned on which in turn turns on transistor T12 which serves to continuously trigger the transistor T14. In effect, transistor T14 becomes a self-closing switch.

Once transistor T12 is turned on as described, with toggle switch TS1 in its illustrated right-hand position, current flow may be traced from reference point F through transistor T12, through relay solenoid RS1, through toggle switch TS1, to reference point E. Thus, the relay solenoid RS1 will be energized and the switch S4 associated therewith will be depressed from the position shown in FIGURE 10. Once the switch S4 is closed, the relay solenoid RS2 is energized by virtue of current flow from reference point D through toggle switch TS1, closed switch S4, relay solenoid RS2, and out through fuse 7*b* to reference point B. Energization of the relay solenoid RS2 closes the switch contact S2*d* thereof whereby the switch S4 in effect is short-circuited such that the relay solenoid RS2 becomes self-locking.

Similarly, relay solenoids RS4 and RS3, with switch S6 associated with relay solenoid RS4 and switch S1*d* associated with relay solenoid RS3, function in a corresponding manner to cause relay solenoid RS3 to become self-lockingly energized when toggle switch TS1 is tripped to the left hand portion in FIGURE 10. For convenience, the following description will assume a position for the toggle switch TS1 as shown in FIGURE 10, it being understood that the relay solenoids RS4 and RS3 and the switches S6 and S1*d* function in an analogous manner.

While the switch S4 is shown as schematically associated with the relay solenoid RS1, it should be understood that in the described embodiment this association is a mechanical one as opposed to a conventional relay switch operation. In other words, the relay solenoid RS1 is one of the solenoids on the previously described braking and control assembly 400 and energization of that solenoid is utilized to mechanically close the switch S4 in the following way: energization of the solenoid 419 raises the arm 439 so that a microswitch S4, which is mounted on L-bar 401, is closed. It should be noted that microswitch S4 does not close until arm 439 has been raised by solenoid 410 a sufficient distance so that it clears arm 428 leaving shaft 424 clear to rotate in one direction.

As the brake shaft 424 rotates 180°, the arm 430 thereof hits the cam follower 431, the end finger extension 436 of which correspondingly moves the switch designated as MS1 in FIGURE 10 to the upper position shown therein.

It will be observed that the resistor R28 (which is part of a thermal time delay switch system 611 shown in FIGURE 10 as comprising the resistor R28 and a thermally sensitive switch arm 612) is always connected across the potential B–D thru either of the switch contacts S1*d* or S2*d* associated with relay solenoids RS3 and RS2 respectively whenever a halt position is signalled (i.e., a halt position is signalled whenever either relay solenoids RS2 or RS3 is de-energized). When the cart 300 is moving in any direction either the switch S1*d* or the switch S2*d* will be depressed by the respective solenoids RS3 or RS2 whereby the resistor R28 will be open circuited. Of course, only when the resistor R28 is heated sufficiently to cause the thermally sensitive switch arm 612 to close (i.e. to go to the down position) will the desired conduction through transistor T14 occur. Accordingly, when resistor R28 is open circuited, transistor T14 will also be open circuited, subject to transient induced delays.

In other words, when the truck 300 is in a halt position, the various switches of the start circuitry 610 will be in the positions shown in FIGURE 10. The resistor R28 will be energized from reference point B through resistor R28, through normally up switch contact S2*d*, and through toggle switch TS1 to reference point D. The energization of resistor R28 will in turn maintain the thermally sensitive switch arm 612 of the thermal delay switch system 611 closed, whereby current may be traced from reference point A through resistors R27 and R26, through transistor T14, switch arm 612 through contact switch S30 associated with relay solenoid RS35, through contact switch S5 associated with relay solenoid RS5, and through the microswitch MS1 to reference point D.

This current flow through the transistor T14 will, as previously described, excite current flow from reference point F through transistor T12 so as to energize the relay solenoid RS1 which event allows for the mechanical closing of the switch S4. When the switch S4 is closed, the relay solenoid RS2 is energized and its switch contact S2*d* is closed, whereby the relay solenoid RS2 is self-lockingly energized and whereby the resistor R28 is open circuited. After a few moments (due to the transient effects in the thermal time delay switch system 611), the thermal switch arm 612 will open. Also, the microswitch MS1 will be raised to its upper position by virtue of the previously described sequence of events in the brake and control system 400.

At this stage, it may be observed that the described movement of the microswitch MS1 will energize the relay solenoid RS5 by virtue of current flow from reference point B through relay solenoid RS5, diode D13, microswitch MS5, to reference point B. As the relay solenoid RS5 is thus energized, its associated contact arm S5 is open circuited whereby the described current flow through the transistor T14 is halted.

Thus, once the start signal has started the truck 300 on its journey (in a manner to be subsequently described), a signal will be received from the brake through the transistor T14 by virtue of the described manipulation of microswitch MS1. When the transistor T14 no longer conducts, the transistor T12 of course will no longer conduct and the relay solenoid RS1 will be de-energized. Moreover, this is perfectly desirable because the relay solenoid RS1 has already performed its dual functions of releasing the arm 428 of the braking and controlling system 400 and of self-lockingly energizing the relay solenoid RS2 for purposes to be hereinafter described.

The thermal time delay switch system 611 is provided so that the cart will not start up until a momentary time has elapsed once the battery switch 613 (see FIGURE 8) is closed. In other words, when the battery switch 613 is first closed (as indicated by the lamp 613L) transient effects occurring in the circuitry system might start the cart operating even though a start signal from the lamp L7 (see FIGURE 13) had not been received. But, switch arm 612 will remain open until a sufficient time has elapsed for resistor R28 to heat up and cause the thermal sensitive switch arm 612 to flex closed. Until switch arm 612 closes, no start signal will be generated.

Thus, thermal time delay system 611 prevents objectionable transient induced false start ups. However, once the thermal time delay switch system 611 has performed this initial function, its presence in the circuitry is no longer desired, since the switch arm 612 will remain closed for a few moments even though the resistance R28 is not energized by virtue of transient effects in the thermal time delay system itself.

This could produce an undesirable feature of operation. Thus, it might happen that once a start signal has been received and the switch MS1 has been elevated from its position shown in FIGURE 10, the switch arm 612 would nonetheless remain in its closed position due to transient effects even though the resistor R28 had previously been open circuited. If an emergency should develop such that a brake signal would be delivered from the braking and control system 400, the switch MS1 would be depressed to its lower position and a start signal would be generated through the transistor T14 since the switch arm 612 would remain in its closed transient induced position. This is particularly undesirable since a start signal would be generated when conditions called for a halt or brake signal from the braking and controlling system 400.

To provide for this eventuality, the capacitor C5 is placed in parallel with relay solenoid RS5. Thus, should the microswitch MS1 be depressed back to its position as shown in FIGURE 10, the relay solenoid RS5 would be open circuited. However, the stored potential of the capacitor C5 would dissipate across the parallel connection of relay solenoid RS5 whereby the switch contact arm S5 associated therewith would be opened so that even if the switch arm 612 of the thermal time delay system 611 were closed, a start signal could not be generated.

The relay solenoid RS5 and its attendant parallel capacitor C5 are thus provided to avoid the objectional features attendant to the utilization of a thermal time delay system 611 which in turn was originally inserted so as to obviate objectionable features which might arise by virtue of transients in the circuitry when the entire circuitry is originally being switched on.

The low voltage circuitry 630 is also shown in FIGURE 10. The circuitry 630 comprises a voltage dividing bridge comprising the series resistors R70, R71, and R72. The bridge senses approximately one half the voltage across reference points A and B by virtue of the variable tap 701. If the potential at reference point C becomes more negative than the voltage sensed at the variable tap 701, transistor T80 will conduct and will thereby excite transistor T81 through resistor R74. When transistor T81 is thus excited for current draw from reference point A through resistor R73 (capacitor C20 being a conventional transient suppressant), the transistor pair comprising the transistors T80 and T81 will become self-lockingly energized, whereby the relay solenoid RS30 is energized so as to move the switch contact arm S30 associated therewith to the rights in FIGURE 10 and thereby to light the lamp L20. Thus, the low voltage circuitry 630 signals a weak battery condition and prevents the previously described start signal from traversing the circuitry 610.

To further correlate the operation of the braking and controlling system 400 with the start circuitry 610 shown in FIGURE 10, it should be observed that as the brake shaft arm 424 rotates by 180 degrees it will cause the toggle switch TS1 to move from its illustrated position to a lefthand position depending upon the direction of travel. The direction shown is the rearward direction position, and correspondingly, when the toggel switch TS1 is shifted to its lefthand position, a forward direction sequence of events for relay solenoids RS4 and RS3 corresponding respectively to relay solenoids RS1 and RS2 will be traced. As previously indicated, the switch S6 corresponds to the switch S4 and is likewise a microswitch position for operation by the braking and controlling system 400, as described for the microswitch S4.

The diodes D6–D9, respectively connected in parallel with the relay solenoids RS1–RS4, are provided as conventional transient suppressants.

*Drive circuitry (FIGURES 10 and 8)*

From the foregoing description of the start circuitry 610, it will be appreciated that the relay solenoid RS2 is energized when a start rearward signal is given and correspondingly the relay solenoid RS3 is energized when a start forward signal is given. Either of these events will correspondingly close the associated contact arms S2*c* and S1*c* respectively. When either of the contact arms S2*c* or S1*c* are closed, the reference points J and K will be short circuited to each other (see FIGURE 10).

Shunt winding 605 of reversible split series drive motor DM is connected on one side to reference point E (i.e., minus 24 volts) and at the other side to reference point K. Reference point J is connected via switch contact arm S6*c* if opened to reference point A (i.e., 0 volts) or if closed to reference point C (i.e., 12 volts). Since reference point J is shorted to reference point K during a drive condition, it is apparent that the shunt winding 605 will have either 12 or 24 volts impressed thereacross depending upon the position of the switch contact arm S6*c*.

When the relay solenoid RS2 of FIGURE 1 is self-lockingly energized as previously described with reference to the start circuitry 610, the switch contact S2*d* will be closed whereby, in a forward direction, positive current may be traced from reference point D through toggle switch TS1, through switch contact arm S2*d* to the top of the relay solenoids RS7 and RS8 shown in FIGURE 8. Current may then be traced through relay solenoid RS7, lamp L8 in series therewith, normally open switch contact arm S6*a*, bypassing relay solenoid RS6, and then through fuse 7*d* to reference point B. No current will be observed through relay solenoid RS8 and lamp L9 in series therewith since this event will occur only when normally open switch contact S6*a* is closed.

Relay solenoid RS6 shown in FIGURE 8 is designed to be self-lockingly energized when relay solenoid RS2 of FIGURE 10 is energized, as follows: Before relay solenoid RS2 is energized (i.e., a halt position in which resistor R28 of thermal time delay switch system 611 is energized), the potential B–D is impressed across relay solenoid RS6, since positive current may be traced from reference point B through fuse 7*d* to the bottom of the relay solenoid RS6, through diode D10, and then through either switch contact S1*d* or S2*d* (depending upon which is closed), through toggle switch TS1 to reference point D.

However, when relay solenoid RS2 pulls in (or correspondingly when relay solenoid RS3 pulls in), either the switch contact S2*d* or S1*d*, as the case may be, will be open circuited whereby the B–D potential for relay solenoid RS6 will be open circuited. The relay solenoid RS6 is self-lockingly energized through its own closed switch contact arm S6*d*. Since relay solenoid RS6 will close all its switch contact arms S6*a*, S6*b*, S6*c*, and S6*d* whenever the cart is running, as described, the maximum or high speed 12 volts will be impressed upon the shunt winding 605 since the contact arm S6*c* will be in its closed position.

However, it should be observed that if microswitch MS2 (FIGURE 8) should be pulled open, even if only momentarily, relay solenoid RS6 will be thereby shut off and will not thereafter be turned on again since it is self-locking via its own contact arm S6*d* which is in series with microswitch MS2. Once contact arm S6*d* is opened by virtue of a momentary absence of current through relay solenoid RS6, relay solenoid RS6 would no longer be self-locking without an initial signal to energize the solenoid coils.

Thus, in order to slow down the speed of the traveling cart, an extension bar may be positioned along the floor (see the exemplary bar 229 in FIGURE 1) so as at an appropriate position of travel to open the microswitch MS2 whereby the relay solenoid RS6 will be de-energized the contact arm S6c thereof will revert to its original position, and a low speed or 24 volts traveling operation will be evidenced.

The drive motor DM is energized as follows: When current reaches the top of the relay solenoids RS7 and RS8 it will energize the relay solenoid RS7 and a lamp L8 in series therewith, if the switch contact arm S6a is in the position shown in FIGURE 8 and conversely it will energize the relay solenoid RS8 if the switch contact arm S6a is in a down or closed position as compared to that shown in FIGURE 8. When the relay solenoid RS7 is closed, the switch S7 associated therewith is closed, and when the relay solenoid RS8 is closed, the switch S8 associated therewith is closed. When the switch S7 is closed and the switch S8 is open only 6 volts are impressed across the drive motor DM through the split series field winding Fa2 and the armature winding AR2 from reference point D to reference point C. However, when the switch S8 is closed and the switch S7 is open, 12 volts will be impressed across the drive motor DM from reference point A through switch S8 and through split series field winding Fa2 and armature winding AR2 to reference point C.

It should be observed that the described switching mechanism provides a correlation between maximum and minimum energization of the drive motor DM and of the shunt winding 605. In other words, when high speed or 12 volt motor operation is required, the relay solenoid RS8 is energized and the relay solenoid RS6 is energized whereby a maximum or 12 volt energization of the drive motor DM is achieved and a minimum or 12 volts energization for the shunt winding 605 is achieved, whereas when relatively low speed motor operation is desired, the relay solenoid RS7 is energized but the relay solenoid RS6 is de-energized whereby a minimum or 6 volts motor energization is achieved and a maximum or 24 volts energization of the shunt winding 605 is achieved. The shunt winding 605, of course, acts as an electrical brake on the motor DM since it is provided in opposition to the driving windings thereof.

Correspondingly, the relay solenoids RS17 and RS18 with their associated contact switches S17 and S18 respectively, are provided in combination with the other of the split series field windings Fb2 and with the lamps L10 and L11 respectively in association with the contact arm S6b to provide the exact same operation in response to relay solenoid RS3 instead of relay solenoid RS2. Likewise, the switch MS3 is provided as the analogue of the switch MS2, whereby the exact same two speed motor operation in the forward direction as in the rearward direction may be achieved.

The lamps L8, L9, L10, and L11 are provided in series with the respective solenoids RS7, RS8, RS17, and RS18 since it is known that an electric lamp offers a relatively low initial resistance such that a potential across the series combination of the solenoid coil and an electric lamp will initially be mostly impressed across the relay coil. The relay coil needs a relatively high potential to pull in, as compared to a potential for it to remain locked in because of the mechanical transients which impede the pulling of the switch across space. However, once the light draws current and lights up, its resistance increases so that correspondingly less amperage is drawn through the relay coils per se. In other words, for a fixed potential across the series combination of a lamp and a relay coil, the characteristic increase in resistance of the lamp thereby decreases the current of the fixed potential through the relay coil. This is completely consonant with desired operating characteristics since the relay coil requires a high surge in order to pull in and yet requires a lesser amount of current in order to stay locked in.

The diodes D11–D17 are provided in the drive circuitry 615 as conventional transient suppressants.

*Steering circuitry (FIGURE 9)*

The steering circuitry generally designated as 200 is shown in FIGURE 9. The circuitry 200 comprises forward direction photosensitive devices (e.g., conventional photocells whose resistance is lowered in response to an increased reception of light) P1 and P2 and rearward direction photosensitive devices P3 and P4. The elements P1, P2, P3, and P4 are shown in FIGURE 9 as each centrally positioned over the respective dividing lines on opposite sides of a schematic representation of a guide tape 230 (as previously described) comprising a white inner-band 233 and two black marginal bands on either side 231 and 232. This, of course, is the position when the cart 300 is centrally aligned on the guide tape 230 and no steering correction is required.

The circuitry 200 further comprises clockwise direction subcircuitry 200c including transistors T201, T203, T205, T207, T209, and T212 and resistors R1, R3, R5, R7, R9, R11, R13, R15, R17, and R18; counter-clockwise direction subcircuitry 200cc including transistors T202, T204, T206, T208, and T218 and resistors R2, R4, R6, R8, R10, R12, R14, and R16; reversible split series field steering motor 340 having an armature coil AR, split series field windings Fa and Fb connected respectively to the collectors of transistors 210 and 212 respectively, and protective diodes D1 and D2; potentiometer bridge 344 comprising the photosensitive devices P5 and P6 and their respective signal lights L5 and L6; and a four pole double throw switch system S comprising the associated relay contacts S1a and S1b and the associated relay contacts S2a and S2b, the former pair responding to relay solenoid RS3 and the latter pair responding to relay solenoid RS2. As previously described, the photosensitive bridge 344 is structurally mounted on the drive means 302 such that deflection of the steering wheels 332, 332a from a parallel alignment with the longitudinal axis of the frame 310 of the cart 300 causes one of the photosensitive devices P5 and P6 to receive more and the other to receive less light depending upon the direction of the deviation.

The operation of the steering circuitry 200 may be appreciated from the following description, which first assumes a counter-clockwise deviation of a forward or leftward moving truck 300 from the guide tape (with reference to the schematic tape 230 shown in FIGURE 9), the switch system S being in the position shown when the cart 300 is stationary.

With a twenty-four volt battery 3 (see FIGURE 8) having terminal taps 31, 31a, 31b, 31c and 29 giving 6 incremental volts respectively (i.e., if terminal 31 is assumed to be 0 volts positive potential terminals 31a, 31b, 31c and 29 will be at −6, −12, −18, and −24 volts respectively) the potential across points A and D, i.e., across the series combination of forward direction photosensitive devices P1 and P2, will be 18 volts (A being 0 and D being −18 volts). Similarly, the potential across the series combination of rearward direction photosensitive devices P3 and P4 and likewise across the potentiometer bridge 344 will be 18 volts under a corresponding analysis. Reference point N between forward direction photosensitive devices P1 and P2 will connect to reference point M between rearward direction photosensitive devices P3 and P4 through relay contacts S2a and S1a; reference point M will, in turn, connect to reference point O between the photosensitive devices P5 and P6 of potentiometer bridge 344 through relay contacts S1a, S2a, and S1b. Reference point O, of course, connects in between the series combination of the emitters of transistors T202 and T201, and shorted reference points N and M connect, via the switch system S, in between the series combination of the bases of the transistors T202 and T201. At this given position, it is apparent that the respective bases and emitters of each of transistors 201 and 202 will be in an equal potential characteristic and, therefore, neither of the transistors T201 and T202 will conduct.

As long as the truck 300 remains on a true forward (straight left in FIGURE 9) non-moving course, forward direction photosensitive devices P1 and P2 and correspondingly rearward direction photosensitive devices P3 and P4 will each be sensitive to a given amount of light, which in the described embodiment is about 50% black and 50% white when the said photosensitive devices are centered over the respective dividing lines between the black and the white portions of the tape 230. Therefore, reference points N and M will be at −9 volts potential. The respective bases of transistors T201 and T202, which are connected to the shorted reference points N and M, will also be at −9 volts potential. Since the potentiometer bridge 344 is likewise 50% balanced (that is, each of the photosensitive devices P5 and P6 are positioned to receive about one half of the light emitted from their respective sensing lights L5 and L6), the emitter of transistors T201 and T202 will also be at −9 volts potential, that is, at the same potential as the respective bases of the transistors T201 and T202.

When the cart 300 starts to move forward (i.e., to the left in FIGURE 9), an appropriate signal (as previously described) energizes switch system S (by energizing relay solenoid RS3 such that the relay contacts S1*a* and S1*b* are brought down in FIGURE 9 while the relay contacts S2*a* and S2*b* remain in their illustrated position. It should be apparent that under these circumstances reference points M and O will be open circuited through switch system S, whereas reference point N will be connected through relay contacts S2*a* and S1*a* in parallel to the bases of the transistors T201 and T202. The provision of parallel dual relay contact switching serves two functions, namely, a safety factor in case of malfunction of one relay contact and a lowering of junction resistance whereby the extended utility of the relay contacts may be enhanced.

If the truck 300 deviates in the indicated counterclockwise forward sense (i.e., downwards and to the left in FIGURE 9), the previously balanced photosensitive bridge comprising the photosensitive devices P1 and P2 will be thrown off balance. Photosensitive device P2 will be sensitive to a greater percentage of black tape and photosensitive device P1 will be sensitive to a greater percentage of white tape. Thus, the resistance of photosensitive device P1 will be lowered and the resistance of photosensitive device P2 will be raised, whereby the bases of transistors T201 and T202 will receive current at a potential more negative than a −9 volts potential, that is, reference point N will become more negative and correspondingly the said bases will become more negative in potential.

PNP transistor T201 will then conduct since its base is at a more negative potential than its emitter; NPN transistor T202 will be unaffected by the indicated change in potential. Positive current through the PNP transistor T201 may be traced from terminal 31 (at 0 volt) of battery 3 through photosensitive device P6 of potentiometer bridge 344, transistor T201, resistors R1 and R3 to terminal 31*c* (at −18 volts) of battery 3.

When PNP transistor 201 is thus switched on, it will in turn activate the transistor trio comprising NPN transistor T203, NPN transistor T205, and PNP transistor T207. Current flow through the said transistor trio or cascade will then trigger the NPN transistor T209, which, in turn, triggers PNP transistor T212, thereby allowing current to flow through the reversible steering motor 340 in a given direction.

In somewhat greater detail, the operation of the cascade trio of transistors T203, T205, and T207 may be appreciated as follows: When the balance-sensing transistor T201 commences to conduct (by virtue of an unbalance in the forward direction bridge comprising the photosensitive devices P1 and P2, as translated into a potential difference between the base and the emitter of transistor T201), current flows from the collector of transistor T201 through the series combination of resistors R1 and R3 to reference point D (i.e., terminal 31*c* of the battery 3). The base of transistor T203 senses this current flow by virtue of its connection in between the series combination of resistors R1 and R3. Transistor T203 will then commence conducting due to the potential difference between its base and its emitter; however, very little or no amplification across the transistor 203 will be evidenced, since the collector and the emitter thereof are essentially at the same potential. Current flow may nonetheless be traced from the emitter of transistor T203 through the resistor R5 in series therewith to reference point D. This phenomenon causes transistor T205 to conduct since the base thereof is connected in between the emitter of transistor T203 and the resistor R5. Transistor T205 does in fact amplify as it conducts since it allows current flow from the positive reference point A (i.e., terminal 31 of battery 3) through the series combination of resistors R11, R9, and transistor T205 to reference point D.

A critical value is thus defined for the switching on of transistor T207, since the base thereof is connected in between the series combination of resistors R11 and R9 and, therefore, is at a potential equal to the potential drop from reference point A across resistor R11. When this critical potential value is more negative than the potential of reference point B (i.e., a −6 volts under the assumed battery conditions), PNP transistor T207, the emitter of which is connected to reference point B, will commence conducting.

This phenomenon in turn will supply current to the collector transistor T203 via current flow from reference point D through transistor T207 and resistor R7 to the collector of transistor T203. Obviously, once this event has transpired, transistor T203, which had previously conducted only a relatively small current flow by virtue only of the potential difference between its base and its emitter, will now amplify current by virtue of the more positive potential at its collector as compared to its emitter. The cycle of transistor T203 exciting transistor T205 which in turn excites transistor T207 and which in turn allows current amplification across transistor T203 will continue, and the cascade trio exhibits "runaway" characteristics.

Once the potential drop across resistor R11 is sufficient to excite the transistor T207, a relatively strong signal is generated to excite the transistor T209 (the base of which is connected between the series combination of resistors R15 and R13 which are in parallel with the series combination of resistor R7, transistor T203, and resistor R5 across the collector of transistor T207 and reference point D). When transistor T209 is thus excited, current flow may be traced from reference point A through resistors R18 and R17 in series and transistor T209 to reference point C. The base of transistor T212 which is connected in between the series combination of resistors R18 and R17 is thus energized and the motor 340 operates by virtue of current flow from reference point B, through transistor T212, split series field winding F*b* and armature winding AR, to reference point E.

It should be apparent from the foregoing that the operational characteristics of the described circuitry may be effectively varied by controlling the value of the resistor R11. The larger the value of the resistance R11, the larger will be the potential drop thereacross, and, therefore, the more readily will transistor T207 become excited in order to generate the described cascade runaway. If desired, the resistors R9 and R11 may be combined into a single potentiometer (not shown) whereby various values for the resistor R11 may be chosen by suitable settings of the potentiometer arm which, of course, would be connected to the base of transistor T207, thereby to allow various ranges of sensitivity of the described circuitry to a given unbalance initial signal.

When the motor 340 is activated as described, it mechanically moves the steering wheels 332 and 332*a* (see FIGURE 2) in a clockwise sense with reference to the schematic tape 230 shown in FIGURE 9, and it likewise causes the lights L5 and L6 of potentiometer bridge 344, which are mounted on the steering linkage bar 336, to be correspondingly deflected in a clockwise sense. Thus, photosensitive device P5 receives more of the light emitted by lamp L5 and correspondingly photosensitive device P6 receives less of the light emitted by lamp L6, thereby tending to make reference point 0 more negative and thus thereby tending to equalize the potential of the base and of the emitter of transistor T201.

It should be understood that it would be an obvious variation to mount the lamps L5 and L6 on the frame of the truck 300 and to mount the photosensitive devices P5 and P6 on the steering linkage bar 336 whereby the same result of changing the potential at reference point 0 could be achieved by appropriate relative movements between lamps L5 and L6 on the one hand and photosensitive devices P5 and P6 on the other.

Since the photosensitive devices P1 and P2 are moved in a clockwise sense by virtue of the movement of the steering wheels 332 and 332*a*, photosensitive device P1 conducts relatively less and photosensitive device P2 conducts relatively more, whereby the potential at reference point N becomes more positive and the base of transistor T201 connected thereto becomes more positive. Likewise, since linkage bar 336 is also moved in a clockwise sense, photosensitive device P5 conducts relatively more and photosensitive device P6 conducts relatively less, whereby the potential at reference point 0 becomes more negative and the emitter of transistor T201 connected thereto becomes more negative. Of course, when the potential at reference point 0 is equal to the potential at reference point N, the transistor T201 is shut off, and the previously described transistor cascade trio comprising transistors T203, T205 and T207 is likewise shut off, and transistors T209 and T212 are in turn shut off, whereby the motor 340 is de-energized.

The diode D2, connected in parallel across the series combination of windings F*b* and AR, is provided to prevent transcience flashback voltage which would injure the circuitry as the motor 340 is thus de-energized.

Had the original deviation from the true forward path been in a counter-clockwise direction (with reference to the guide tape 230 shown in FIGURE 9), the corresponding series of events through counter-clockwise sub-circuitry 200*cc* comprising transistor T202, the trio of transistors T204, T206, and T208, motor exciting transistor T210, and reversible motor 340 in an opposite sense (i.e., through field winding F*a* instead of through field winding F*b*) would have occurred. In other words, counter-clockwise subcircuitry 200*cc* is essentially a mirror image of clockwise subcircuitry 200*c*, with the following minor variation: Counter-clockwise subcircuitry 200*cc* is not provided with structure corresponding to transistor T209, that is, transistor T208 (corresponding to transistor T207) excites transistor T210 (corresponding to transistor T212) directly, without any intermediary transistor corresponding to transistor T209 being present. This variation, of course, occurs because the motor energizing transistors T210 and T212 are both provided as PNP type transistors, whereas the corresponding transistors T207 and T208 are PNP and NPN type transistors respectively. Accordingly, an additional transistor T209 (of the NPN type) must be provided intermediate the transistor T207 and the transistor T212 in order for the described phenomenon of motor operation to occur.

It should be apparent that the described mechanism and circuitry will operate in conjunction to steer the truck 300 as it deviates from a given forward direction. Signal means to sense the directional deviation comprising a photosensitive bridge, an unbalance sensing transistor switch, and amplification circuitry will actuate the steering motor which mechanically corrects the indicated deviation and simultaneously alters the circuitry (via a mechanical correction to the balance of the potentiometer bridge setting by the shifting of positioned lights L5 and L6) thereby tending to erase the signal which originally excited the motor. The truck 300 will hunt back and forth over incremental deviations in opposite directions so as to produce a resultant generally straight forward movement.

When the truck 300 is traveling in the rearward direction (that is to the right with reference to the schematic guide tape 230 shown in FIGURE 9), a corresponding series of events will occur in order to steer the cart 300 in a true rearward direction. In the rearward direction travel, an unbalance sensing bridge comprising the photosensitive devices P3 and P4 is utilized in place of the forward direction unbalance sensing bridge comprising the photosensitive devices P1 and P2. Correspondingly, the photosensitive devices P3 and P4 are located adjacent the rear of the truck 300, whereas the photosensitive devices P1 and P2 are located adjacent the front of the truck 300.

For rearward direction travel, appropriate signals are given to the switch system S (i.e., relay solenoid RS3 is de-energized and relay solenoid RS2 is energized) such that the relay contacts S1*b* and S1*a* are allowed to return to their original positions (that is, the up position shown in FIGURE 9), while the relay contacts S2*a* and S2*b* are moved to a down position (that is, opposite to that shown in FIGURE 9). Reference point M will thus replace reference point N as the point connected to the bases of transistors T201 and T202, since reference point M will be connected to those bases via relay contacts S2*a* and S1*a*, whereby the previous described advantage of dual relay contact are achieved.

However, one important variation in the rearward direction travel is evidenced. The forward direction photosensitive bridge comprising the photosensitive devices P1 and P2 are utilized in the rearward direction steering sequence (whereas the rearward direction unbalance bridge comprising the photosensitive devices P3 and P4 were completely absent from the forward direction steering sequence). As indicated by the described positions of the switch system S, the photosensitive device P1 will be connected in parallel with photosensitive device P5 and likewise photosensitive device P2 will be connected in parallel with photosensitive P6 via relay contacts S2*b* and S1b. Thus, the unbalance sensed by the series photosensitive devices P1 and P2 is impressed onto the circuitry since the potential at reference point O will be affected by the potential at reference point N.

It has been found that the rearward direction steering sequence is best controlled by utilizing both the unbalance sensing bridges comprising respectively the photosensitive devices P3 and P4 as the major control element and the photosensitive devices P1 and P2 as a secondary control element. Apparently, the advantage of utilizing both the unbalance sensing bridges in the rearward direction travel arises by virtue of the fact that the steering wheels 332 and 332*a* are located adjacent the front of the truck 300. Thus, analogously to the operation of an automobile, it is known that it is much easier to steer an automobile in the forward direction (when the steering wheels are at the front of the car) than it is to steer an automobile in the rearward direction. At any rate, the provision of both unbalance sensing bridges in the rearward direction sequence, that is, the major control element comprising the photosensitive devices P3 and P4 at the rear of the truck 300 and the secondary control elements comprising the photosensitive devices P1 and P2 at the front of the truck 300, gives the most satisfactory results when an accurate steering sequence is desired in the rearward direction and is, therefore, the preferred mode of operation.

In a given operation, it may be desired to substitute a conventional potentiometer for the potentiometer bridge 344 comprising the photosensitive devices P5 and P6 with their attendant lights L5 and L6. Thus, a potentiometer could be provided on the truck 300 such that rotation of the motor 340 would cause, via appropriate mechanical interconnections, a resetting of the potentiometer arm thereof. While this system could obviously operate in the same functional manner as previously described, the provision of a potentiometer bridge 344 in the form of photosensitive devices is preferred in that no mechanical wear is evidenced, as would be the case if a mechanically set conventional potentiometer were connected to the motor 340.

*Details of the photosensitive device structure (FIGURES 14, 12 and 11)*

FIGURE 14 illustrates a schematic representation of a photosensitive device P mounted in the bottom portion 330*b* of the circuitry box 330 shown in FIGURE 2. Preferably, the photosensitive device P is mounted within a black cardboard tubing 500 which is concentrically inserted within a flexible diaphragm 502 for shock-absorbent positioning of the photosensitive device P within the circuitry box 330. A reference lamp L is also mounted on the exterior of the bottom 330*b* of the circuitry box 330. The lamp shines down on the guide tape 230 (as previously described) and the light reflected therefrom is received within the black cardboard tube 500 for impingment onto the photosensitive device P.

Thus, the lamps L1, L2, L3, and L4 are provided for positioning adjacent the photosensitive devices P1, P2, P3, and P4 (see FIGURE 9) in the general manner suggested by the schematic illustration of FIGURE 14. The lamps L1–L4 are provided in series connection in the subcircuitry described in FIGURE 12 so that variations in the battery potential will not effect the intensity of these reference source lights and further such that these lights will not be so dim that, for instance, the steering circuit (as previously described) will be unable to recognize the desired color change signals.

The subcircuitry 600 shown in FIGURE 12 comprises the lamps L1–L4 in series with the parallel combination of transistor T10 and resistor R21 between reference points A and D, which, as shown in FIGURE 8, correspond respectively to the 0 volt potential and the −18 volts potential on an assumed 24 volt D.C. battery with six incremental volts per battery terminal. A voltage reference source such as the Zener diode 601 is connected in series with resistor R20 across reference points A and D or, in other words, in parallel connection with the previously described series combination of lamps L1–L4 in series with each other and in series with the parallel combination of transistor T10 and resistor R21. A potentiometer P21 is connected in parallel with the voltage reference source 601, as is a capacitor C1, and the potentiometer arm 22 is electrically connected to the base of the transistor T10.

The circuitry 600 is provided with a constant potential reference source as by the Zener diode 601 (adjusted for manufacturing tolerances to a given value by the presence of the potentiometer P21). The desired output reference voltage is transmitted to the base of the transistor T10 which is thereby triggered or turned on so as to enable current flow through the series combination of lamps L1–L4. The resistor R21 is provided so as to minimize the current draw through the transistor T10 and thereby to prevent excessive wear and possible burn out of that component. The transistor T10 is provided since, without it, a relatively heavy-duty and expensive Zener diode 601 would be needed in order to draw current through the series lamps L1–L4 as required. By utilizing a current amplifying transistor such as the transistor T10, a far less expensive reference voltage source can be utilized in order to trigger the transistor T10, which then amplifies the current draw through the lamps. Resistor R20 is provided for heat dissipation, and the capacitor C1 is provided to prevent transient effects in a conventional manner.

The lamps L5 and L6, which are the reference lights for the photosensitive devices P5 and P6 shown in FIGURE 9, are provided in parallel with each other and in parallel with the series combination of diodes D3, D4, and D5, the said parallel combination being in series with a resistor R19 between reference points D and E. The series combination of diodes is provided so as to limit the total potential drop across the lamps L5 and L6 in parallel therewith, whereas the resistor R19 is provided to limit the current draw to the lamps. In this manner, a relatively dim output is achieved for the lights L5 and L6 which is desirable, since, if the lights L5 and L6 were allowed to shine as brightly as possible, the respective resistances of photosensitive devices P5 and P6 in the potentiometer photosensitive bridge 344 of FIGURE 9 would be so low that the parallel combination of the photosensitive bridge 344 and the photosensitive bridge comprising the photosensitive devices P1 and P2 for forward direction in parallel therewith would be predominated by the bridge 344, that is, the photosensitive devices P1 and P2 would have little or no effect upon the steering in the rearward direction. On the other hand, if the lights L5 and L6 are too dim, the opposite effect will be evidenced, in that the devices P1 and P2 will have too much of an effect on the parallel combination of the P1–P2 bridge in parallel with the bridge 344. Therefore, it has been determined that, for example, the 6 volt bank of two lamps L5 and L6 in parallel when regulated by a three diode voltage regulator system to about 2.25 volts (i.e., about ¾ of a volt drop across each diode) gives the desirable results of neither too bright nor too dim light sensing in the photosensitive bridge 344, which is responsive to the light output of the lamps L5 and L6.

*Brake circuitry (FIGURE 10)*

While the previously described two-speed drive and slow-down circuitry 615 (FIGURE 8) may be utilized to slow down a traveling cart from a relatively high speed to a relatively slow speed, the actual braking circuitry 620 is shown in FIGURE 10. When the cart is moving in a rearward direction (i.e., energization of relay solenoid RS2), the series combination of photosensitive device P8 and resistor R30 will have the potential B–D impressed thereacross by virtue of contact arm S2*d* of relay solenoid RS2 being closed. When RS2 is de-energized, photosensitive device P8 and resistor R30 in series therewith will be open circuited. However, when the cart travels in a forward direction (i.e., relay solenoid RS3 energized and relay solenoid RS2 de-energized), the series combination of photosensitive device P7 and resistor R29 will have the potential B–D impressed thereacross by virtue of contact switch arm S1*d* being closed.

As the cart travels along over the guide tape 230, at an appropriate position, it will pass over a black dot on the white central portion (such as the dot 227 shown in FIGURE 1) whereby either of the photosensitive devices P7 or P8 (depending upon the direction of travel) will have an increased resistance, whereby the bases of transistors T17 or T18 will become relatively more negative (that is, they will move closer to reference point D) whereby either of the transistors T17 or T18 (again depending upon the direction of travel) will commence to conduct from reference point C through diode D20, through transistor T17 or T18, resistor R31, resistor R34, and through relay solenoids RS10 and RS11 in parallel to reference point E.

However, the base of transistor T16 is sensitive to current flow through transistor T17 whereby current will flow from reference point A through resistor R33, resistor R32, and transistor T16 through microswitch MS1 which was closed by the initial movement of the braking and control system 400 once the truck 300 commenced traveling, to reference point D. Transistor T15 in turn is sensitive to current flow through the resistors R32 and R33 whereby it is triggered such that current flows from reference point F, through transistor T15, and through the solenoids RS10 and RS11 in parallel to reference point E.

When the brake signal has been passed (i.e., the black dot 227 shown in FIGURE 1), the described current through transistors T17 or T18, as the case may be, will no longer be observed. However, the initial current through transistors T17 or T18 turned on transistor T16 which in turn turned on transistor T15. Current flow through transistor T15 is now sensed through resistor R34 at the base of transistor T16, which thus behaves as a self-closing switch.

The diodes D20 and D21 and the capacitors C20–C22 are provided as transient suppressants to facilitate the described circuit reactions.

Relay solenoids RS10 and RS11 correspond to the solenoids positioned on the braking and controlling system 400 whereby energization of these solenoids releases the arm 430 from its locked driving position and allows the eccentric pulley sheath 426 to tighten about a trained pulley belt 499 and thereby to bring the arm 428 down to its locked braking position. As previously described, when the braking and controlling system 400 approaches its braking position, the switch MS1 is moved to the position shown in FIGURE 10, whereby the brake signal is erased since transistor T16 is open circuited.

*The safety switch system (FIGURE 8)*

Safety circuitry is provided as shown in FIGURE 8 to function as follows: Microswitch MS4 is a mechanical switch mounted on the braking and controlling system 400 which is positioned to be closed when a braking signal is desired. In other words, when a braking signal is utilized in the braking and controlling system 400, the cam follower 433 will close the safety switch MS4. A metal bar may be placed on the floor near the position where it is desired to stop the cart so as to close the microswitch MS5.

The microswitches MS4 and MS5 are connected in series and with each other and with fuse 7*d* across reference points B and D. In other words, when both the switches MS4 and MS5 are closed, a short circuit from B to D will be evidenced and fuse 7*d* will blow, thereby shutting off all the operative mechanisms previously described. Thus, MS4 will be depressed whenever a braking signal is required, and, if the brake system fails to operate whereby the cart continues to move, the switch MS5 will be tripped by a positioned bar on the floor so as to short out the mechanism.

If this fails to work, safety switches MS6 and MS7 are also provided on the truck 300 at the front and the rear thereof whereby contact of the truck with any physical object will depress the switches MS6 or MS7 so as to bypass the series combination of switches MS5 or MS4 and to directly short out the B–D connection across fuse 7*d*.

*Multiple stop circuitry (FIGURES 10 and 15)*

As a first embodiment, the multiple stop circuitry 625 as shown in FIGURE 10. The multiple stop arrangement is provided so that when the cart returns from the archers' line position it may, if desired, stop at any one of a number of given predetermined positions for multiple distance shooting at the target. Of course, when the cart is traveling from the target line to the archers' line, no multiple stopping is desired.

To achieve the multiple stop arrangement, a stepping relay RS31 is provided with the potential B–D thereacross when the cart is traveling in a backward direction (i.e., relay solenoid RS2 energized), as may be traced from reference point D through toggle switch TS1, switch contact S2*d* of relay solenoid RS2, through stepping relay RS31, closed microswitch MS8, to reference point B. Microswitch MS8 is positioned adjacent the bottom of the cart to be closed each time it passes over a positioned metal bar. Thus, each such passage of the cart over such a metal bar will depress the microswitch MS8 whereby the stepping relay RS31 will be energized to pulse step its wiper arm W1.

The operation of the multiple stop circuitry 625 may be illustrated by reference to the following events with the manual rotary switch 625 being in the extreme clockwise position shown. Each time the microswitch MS8 passes over a metal bar positioned on the guide tape 230, the wiper arm W1 of stepping relay RS31 will be moved to the next adjacent counterclockwise position, that is, from the position *a* successively to the position marked *k* in FIGURE 10.

When the wiper arm W1 is stepped to the position *j*, the relay solenoid RS9 (FIGURE 8) will be energized across the arm 626*s* of rotary switch 626 whereby switch contact arm S9 will be opened so as to de-energize relay solenoid RS6 and thereby to slow down the motor drive, as previously described.

When the wiper arm W1 is stepped to the next consecutive position *k*, current will flow from reference point A, through resistors R33 and R32, through arm 626*b* of rotary switch 626, through wiper arm W1, and then to reference point D, as previously described. Since transistor T15 is sensitive to current flow through resistors R33 and R32, the previously described brake signal to relay solenoids RS10 and RS11 will commence.

Thus, the multiple stop circuitry provides a first slow-down signal followed by a brake signal. Since the rotary switch 626 may be adjusted for response to a number of given predetermined pulsations of relay solenoid RS31 followed by the stepping of wiper arm W1, the archer may adjust the rotary switch 626 as desired so that the cart will stop at a predetermined distance from the shooter's line.

When the rotary switch 626 is in its extreme lefthand position (as seen in FIGURE 10), the multiple stop circuitry 625 is open circuited for non-operativeness. Furthermore, it should be observed that a brake signal across transistor T15 will energize relay solenoid RS30 which serves to reset wiper arm W1 to its illustrated position. Finally, since stepping relay RS31 is energized only when relay solenoid RS2 is energized (i.e., backward direction), forward travel of the truck 300 (i.e., energization of relay solenoid RS3) will not be occasioned by multiple stopping.

An alternate multiple stop circuitry arrangement 625*a* is shown in FIGURE 15, wherein the reference characters *l, m, o, r,* and *q* represent the same connectors in FIGURES 15 and 10. The connectors *n* and *p* and the remainder of multiple stop circuitry 625 as shown in FIGURE 10 are, of course, removed when the alternate circuitry 625*a* of FIGURE 15 is utilized.

The circuitry 625*a* comprises the switches S20, S21, S22, and S23 and the rotary manual switch 626*a* having the arms A1, A2, A3, A4, A5, and A6, which rotate in unison. The circuitry 625*a* is designed to function in the same manner as described for the circuitry 625, that is, a first switch depression at a predetermined position sends a slow-down signal to the drive circuitry of FIGURE 8 and a second switch depression at another predetermined position displaced from the first sends a brake signal to the brake circuitry 620 of FIGURE 10. For example, with the arms A1–A6 in the extreme counterclockwise positions shown (i.e., designated by the reference characters X1 in FIGURE 15), a first depression of switch S21 followed by a second depression of switches S21 and S20 will effect the desired phased slow-down followed by brake sequence. Obviously, positioned extension bars may be positioned at various intervals on the guide tape so that, dependant upon the rotational position of the arms A1–A6 and upon the utilization of various combinations of the switches S20–S22, a given series of multiple stop points will be achieved.

For the embodiment illustrated in FIGURE 15, the following tabulation relates the rotational position of the arms A1–A6 to the sequential switch closures required for first slow-down followed by brake:

| Position of Arms A1-A6 | Slow Down | Brake |
|---|---|---|
| X1 | S21 | S21; S20. |
| X2 | S23 | S23; S22. |
| X3 | S21; S23 | S21; S22. |
| X4 | S23; S20 | S23; S20; S22. |
| X5 | S21; S22; S23 | S21; S22; S20. |
| X6 | S21; S20; S23 | S21; S20; S23; S22. |

It should be understood that various changes, modifications, and alterations may be made in the details of construction, arrangements, and materials for the various elements without departing from the spirit and the scope of the instant invention, as defined in the appended claims.

What is claimed is:

1. A starting circuit for energizing an electric circuit comprising photo-electrically sensitive signal circuitry adapted to be energized by a relatively brief pulsation of light and to emit a signal therefor comprising:

voltage reference source means;

a transformer;

photosensitive means connected in series with the primary winding of the transformer across the voltage reference source means;

capacitor means across the secondary winding of the transformer;

a first PNP transistor, the base of which is connected to one plate of the capacitor means and the emitter of which is connected to the other plate of the capacitor means;

an NPN transistor which conducts in response to current flow through the first PNP transistor, the base of said NPN transistor being connected to the base of said first PNP transistor; and a second PNP transistor which conducts in response to current flow through the NPN transistor, the collector of the second PNP transistor being connected to the base of the NPN transistor, whereby a change in light incidence upon the photosensitive means will be transformed into current flow through the first PNP transistor so as to excite current flow through the NPN transistor, which will thereby excite current flow through the second PNP transistor so as to self-lockingly energize the NPN transistor and so as to emit a signal by virtue of the current flow through the second PNP transistor.

2. Circuitry as claimed in claim 1 further comprising:

on-off switch means in series with the NPN transistor, whereby the signal through the second PNP transistor may be halted by open-circuiting the NPN transistor through the said on-off switch means.

3. Circuitry as claimed in claim 2, wherein the on-off switch means comprise a solenoid actuated switch in series with a thermal time delay switch, and a time delay capacitor in parallel with the solenoid of the solenoid actuated switch.

4. Photo-electrically tripped signal circuitry adapted to be energized in response to a light variation signal and thereby to emit a circuit signal comprising:

photosensitive bridge means;

first transistor switch means sensitive to the output potential of the photosensitive bridge means, said first transistor switch means comprising complementary PNP and NPN transistors effective to provide switching at low switching potential differentials; whereby variations in the light incidence upon the photosensitive bridge means induces current flow through the said first transistor switch means;

second transistor switch means comprising the combination of complementary PNP and NPN transistors sensitive to current flow through the said first transistor switch means; and third transistor switch means sensitive to current flow through the said second transistor switch means, the said second transistor switch means being self-lockingly energized by current flow through the said third transistor switch means, whereby steady state output current flow through the said third transistor switch means effects the desired circuit signal.

5. Automatic self-propelled drive means for traversing a pre-determined route comprising:

a housing;

drive wheel means positioned on the housing;

reversible drive means for driving the drive wheel means to effect longitudinal displacement of the housing;

steering wheel means positioned on the housing;

photo-electrically signalled means for positioning the steering wheel means to effect translational displacement of the housing;

brake means for preventing the driving of the drive wheel means;

means responsive to a predetermined photo-electric signal to actuate the brake means after a given distance in the given direction has been traversed;

means responsive to a predetermined photo-electric signal to actuate the reversible drive means in a given direction; and means responsive to a predetermined photo-electric signal to actuate the reversible drive mechanism in the opposite direction.

6. A photo-electrically controlled self-propelled automobile for traversing a predetermined route comprising:

a housing;

energy storage means positioned on the housing;

means responsive to a pulsation of light to emit a start signal;

two-pole switch means responsive to the start signal to emit a drive signal;

reversible drive means positioned on the housing and responsive to the drive signal to effect longitudinal displacement of the housing in a given direction when the switch means are in one position and in the opposite direction when the switch means are in the other direction;

steering means positioned on the housing and responsive to a photo-electrically measured signal of deviation from a color coded pattern over which the automobile travels; and brake means for preventing the driving of the drive means and responsive to a predetermined photo-electric signal to actuate the brake means after a given distance in a given direction has been traversed.

7. An automobile as claimed in claim 6 and further comprising:

means responsive to a predetermined photo-electric signal to slow down the automobile.

8. An automobile as claimed in claim 6 and further comprising:

means for effecting a multiple stop performance of the automobile.

9. An automobile as claimed in claim 8 wherein the means for effecting a multiple stop performance of the automobile comprises:

a stepping relay responsive to a predetermined signal in combination with a rotary switch.

10. A self-propelled wheel supported target carrying device responsive to photo-electrically induced signals and to sequential and predetermined automatically controlled switch action to traverse a predetermined path between a firing station and a target station to convey a target between said stations, said device comprising:

a target carrier movable between said stations in response to electrically regulated travel control means;
electric drive motor means responsive to control circuit means for propelling said carrier between said stations;
photo-electric signal circuit means for energizing said drive motor means;
said photo-electric signal circuit means being adapted to emit a relatively brief pulsation of light and comprising:
an electric lamp, a switch, and a resistor in series;
means adapted to impress a potential across the series combination of the lamp, the switch, and the resistor, the resistor offering sufficient impedance to current flow through the lamp so as to prevent the lighting thereof when the switch is depressed; and
a capacitor connected in parallel with the series combination of the lamp and the switch and connected in series with the resistor across the said means, the capacitor providing a time delay discharge surge whereby closure of the switch effects a relatively brief pulsation of light from the lamp.

11. A self-propelled wheel supported target carrying device responsive to photo-electrically induced signals and to sequential and predetermined automatically controlled switch action to traverse a predetermined path between a firing station and a target station to convey a target between said stations, said device comprising:

a target carrier movable between said stations in response to electrically regulated travel control means;
electric drive motor means responsive to control circuit means for propelling said carrier between said stations;
photo-electric signal circuit means for energizing said drive motor means;
said photo-electric signal circuit means being adapted to emit a relatively brief pulsation of light and comprising:
voltage source means;
a transformer;
a photosensitive device connected in series with the primary winding of the transformer across the voltage source means;
a capacitor across the secondary winding of the transformer,
whereby a change in the light incidence upon the photosensitive device effects a transformed variable current through the transformer so as to impress a potential across the capacitor at resonant frequency;
first transistor switch means sensitive to the resonant potential across the capacitor;
second transistor switch means sensitive to current flow through the first transistor switch means; and
third transistor switch means sensitive to current flow through the second transistor switch means,
the said second transistor switch means being sensitive to and therefore self-lockingly energized by the current flow through the said third transistor switch means,
whereby an initial current surge through the said first transistor switch means is realized as a steady state signal through the said third transistor switch means.

12. Circuitry as claimed in claim 11 further comprising:

on-off switch means for open circuiting the said second transistor switch means so as to halt the signal current through the said third transistor switch means.

13. Circuitry as claimed in claim 12 wherein the on-off switch means comprises:

thermal time delay switch means in series with a solenoid actuated switch system, and a time delay capacitor in parallel with the solenoid of the solenoid actuated switch.

14. A self-propelled wheel-supported target-carrying device responsive to photo-electrically induced signals and to sequential and predetermined automatically controlled switch action to traverse a predetermined path between a firing station and a target station to convey a target between said stations, said device comprising:

a target carrier movable between said stations in response to electrically regulated travel control means;
electric drive motor means responsive to control circuit means for propelling said carrier between said stations;
a storage battery supplying current to said drive motor means of said carrier and to electrical controls therefor;
a charging circuit adapted to impress a charging potential across a high voltage reference point and a low voltage reference point when the potential across the said points falls below a given pre-determined value said charging circuit comprising:
transformer input means adapted to be energized from an alternating current source;
first transformer output means and second transformer output means;
a series combination of voltage reference source means in series with the base of an NPN transistor, the said series combination being connected across the low and the high voltage reference points by connecting the emitter of the transistor to the high voltage reference point and by connecting the voltage reference source means to the low voltage reference point;
first rectifying means, the input of which is connected to the first transformer output means and the output of which is connected to the voltage reference source means;
second rectifying means, the input of which is connected to the second transformer output means and the output of which is connected in series with a PNP transistor by connecting the high voltage point of the second rectifying means with the emitter of the PNP transistor, the collector of the PNP transistor being connected to the high voltage reference point and the low voltage point of the second rectifying means being connected to the low voltage reference point; and
means connecting the base of the PNP transistor to the collector of the NPN transistor and to the high voltage point of the second rectifying means,
whereby when the high voltage point of the voltage reference source means is at a greater potential than the high voltage reference point, the NPN transistor commences to conduct such that the PNP transistor commences to conduct so as to impress a charging potential across the high voltage reference point and the low voltage reference point;
target holding means supported on said target carrier;
a steering unit on said carrier for directing the path of travel of said carrier;
photo-electric control circuit means for controlling said steering unit of said target carrier and for controlling said drive motor means;
brake means for braking the movement of said target carrier at selectable positions along said predetermined path; and
photoelectric means for sensing deviation of said target carrying device from said predetermined path and effective to correct said deviation to redirect said device onto said path automatically upon deviation of said device from said predetermined path.

15. A self-propelled wheel-supported target-carrying device responsive to photo-electrically induced signals and to sequential and predetermined automatically controlled switch action to traverse a predetermined path between a firing station and a target station to convey a target between said stations, said device comprising:

a target carrier movable between said stations in response to electrically regulated travel control means;

electric drive motor means responsive to control circuit means for propelling said carrier between said stations;

a storage battery supplying current to said drive motor means of said carrier and to electrical controls therefor;

a charging circuit adapted to impress a charging potential across a high voltage reference point and a low reference point when the potential across the said points falls below a given predetermined value said charging circuit comprising:

transformer input means adapted to be energized from an alternating current source;

first transformer output means and second transformer output means;

a series combination of voltage reference source means in series with first switch means, the said series combination being connected across the low and the high voltage reference points by connecting the switch means to the high voltage reference point and by connecting the voltage reference source means to the low voltage reference point;

first rectifying means, the input of which is connected to the first transformer output means and the output of which is connected to the voltage reference source means;

second rectifying means, the input of which is connected to the second transformer output means and the output of which is connected in series with second switch means by connecting the high voltage point of the second rectifying means with the second switch means, the second switch means being connected to the high voltage reference point and the low voltage point of the second rectifying means being connected to the low voltage reference point; and means for actuating the second switch means in response to actuation of the first switch means, whereby when the high voltage point of the voltage reference source means is at a greater potential than the high voltage reference point, the first switch means commences to conduct such that the second switch means commences to conduct so as to impress a charging potential across the high voltage reference point and the low voltage reference point;

target holding means supported on said target carrier;

a steering unit on said carrier for directing the path of travel of said carrier;

photo-electric control circuit means for controlling said steering unit of said target carrier and for controlling said drive motor means;

brake means for braking the movement of said target carrier at selectable positions along said predetermined path; and photoelectric means for sensing deviation of said target carrying device from said predetermined path and effective to correct said deviation to redirect said device onto said path automatically upon deviation of said device from said predetermined path.

16. A self-propelled wheel-supported target-carrying device responsive to photo-electrically induced signals and to sequential and predetermined automatically controlled switch action to traverse a predetermined path between a firing station and a target station to convey a target between said stations, said device comprising:

a target carrier movable between said stations in response to electrically regulated travel control means;

electric drive motor means responsive to control circuit means for propelling said carrier between said stations;

a source of electric energy supplying current to said drive motor means of said carrier and to electrical controls therefor;

target holding means supported on said target carrier;

a steering unit on said carrier for directing the path of travel of said carrier;

photo-electric control circuit means for controlling said steering unit of said target carrier and for controlling said drive motor means;

reversible variable speed motor drive circuitry comprising:

a variable potential energy source;

reversible drive motor means adapted to be energized upon connection to the said source;

position control relay switch means having first and second two-pole switches;

high-speed relay switch means connected to one pole of the first two-pole switch;

low-speed relay switch means connected to the other pole of the first two-pole switch, whereby energization of the said position control relay switch means excites the high-speed relay switch means and de-energization of the said position control relay switch means excites the low speed relay switch means;

a high-speed on-off switch adapted to be closed upon energization of the high speed relay switch means for connecting the reversible drive motor means in series with a high potential of the said variable potential energy source;

a low-speed on-off switch adapted to be closed upon energization of the low speed relay switch means and connecting the reversible drive motor means in series with a low potential of the said variable potential energy source; and a shunt winding adapted to oppose the drive reaction of the said reversible drive motor means;

the shunt winding being connected to a high potential of the said variable potential energy source when the second two-pole switch of the position control relay means is in one position and being connected to a low potential of the said variable potential energy source when the second two-pole switch of the position control relay switch means is in its other position;

brake means for braking the movement of said target carrier at selectable positions along said predetermined path; and photoelectric means for sensing deviation of said target carrying device from said predetermined path and effective to correct said deviation to redirect said device onto said path automatically upon deviation of said device from said predetermined path.

17. Circuitry as claimed in claim 16 wherein the said high-speed and low-speed relay switch means are respectively connected in series with electric lamps.

18. Circuitry as claimed in claim 16 wherein the said position control relay switch means is self-lockingly energized in series with a two-position speed control switch.

19. Circuitry as claimed in claim 16 and further comprising:

safety switch short circuit means comprising switch means and fuse means in series across the potential of the motor drive circuitry, whereby closure of the said switch means blows the fuse and de-energizes the said motor drive circuitry.

20. A self-propelled wheel-supported target-carrying device responsive to photo-electrically induced signals and to sequential and predetermined automatically controlled switch action to traverse a predetermined path between a firing station and a target station to convey a target between said stations, said device comprising:

a target carrier movable between said stations in response to electrically regulated travel control means;

electric drive motor means responsive to control circuit means for propelling said carrier between said stations;

a source of electric energy supplying current to said drive motor means of said carrier and to electrical controls therefor;

target holding means supported on said target carrier;

a steering unit on said carrier for directing the path of travel of said carrier;

photo-electric control circuit means for controlling said steering unit of said target carrier and for controlling said drive motor means;

brake means for braking the movement of said target carrier at selectable positions along said predetermined path;

photoelectric means for sensing deviation of said target carrying device from said predetermined path and effective to correct said deviation to redirect said device onto said path automatically upon deviation of said device from said predetermined path;

photo-electrically controlled balance circuitry comprising:

first photosensitive bridge means;

second photosensitive bridge means;

first transistor switch means, the base of the transistor switch means being connected to the first photosensitive bridge and the emitter of the transistor switch means being connected to the second photosensitive bridge such that a change in the light incidence upon the first photosensitive bridge means will induce a current flow through the transistor switch means;

amplification transistor switch means responsive to current flow through the first transistor switch means;

bridge unbalance correction means;

second transistor switch means adapted to energize the bridge unbalance correction means in response to current flow through the amplification transistor switch means; and means responsive to the energization of the bridge unbalance correction means so as to tend to restore the first photosensitive bridge means to its original light incidence status while simultaneously altering the light incidence upon the second photosensitive bridge means so as to tend to prevent the current flow through the first transistor switch means.

21. A device as recited in claim 20 and further comprising photo-electrically controlled balancing circuitry adapted to sense and to correct deviations of positioned photosensitive devices from given positions over a color pattern comprising:

a first photosensitive bridge comprising photosensitive devices positioned adjacent a color pattern so as to effect a fixed potential output for the first photosensitive bridge;

a second photosensitive bridge comprising photosensitive devices positioned with respect to reference light source means so as to effect a given potential output for the second photosensitive bridge;

first transistor switch means, the base thereof being connected to the first photosensitive bridge means and the emitter thereof being connected to the second photosensitive bridge means, whereby a change in the light incidence upon the first photosensitive bridge means by virtue of movement of the positioned photosensitive devices with respect to the color pattern will induce a current flow through the transistor switch means;

amplification transistor switch means sensitive to current flow through the first transistor switch means;

bridge unbalance correction means;

second transistor switch means adapted to energize the bridge unbalance correction means in response to current flow through the amplification transistor switch means; and means responsive to the energization of the bridge unbalance correction means for repositioning the photosensitive devices of the first photosensitive bridge means with respect to the color pattern and for repositioning the photosensitive devices of the second photosensitive bridge means with respect to the reference light source means so as to tend to restore the first photosensitive bridge means to its original light incidence status while simultaneously altering the light incidence upon the second photosensitive bridge means so as to tend to prevent the current flow through the first transistor switch means.

22. A self-propelled wheel-supported target-carrying device responsive to photo-electrically induced signals and to sequential and predetermined automatically controlled switch action to traverse a predetermined path between a firing station and a target station to convey a target between said stations, said device comprising:

a target carrier movable between said stations in response to electrically regulated travel control means;

electric drive motor means responsive to control circuit means for propelling said carrier between said stations;

a source of electric energy supplying current to said drive motor means of said carrier and to electrical controls therefor;

target holding means supported on said target carrier;

a steering unit on said carrier for directing the path of travel of said carrier;

photo-electric control circuit means for controlling said steering unit of said target carrier and for controlling said drive motor means;

photo-electrically controlled balance circuitry comprising:

first photosensitive bridge means;

second photosensitive bridge means;

first transistor switch means adapted to sense a potential difference between the first photosensitive bridge means and the second photosensitive bridge means, such that a change in the light incidence upon the first photosensitive bridge means will induce a current flow through the transistor switch means;

amplification transistor switch means responsive to current flow through the first transistor switch means;

bridge unbalance correction means;

second transistor switch means adapted to excite the bridge unbalance correction means in response to current flow through the amplification transistor switch means;

means responsive to the energization of the bridge unbalance correction means for minimizing the potential difference between the first photosensitive bridge means and the second photosensitive bridge means by restoring the first photosensitive bridge means to its original light incidence status while simultaneously altering the light incidence upon the second photosensitive bridge means so as to tend to prevent the current flow through the first transistor switch means; and brake means for braking the movement of said target carrier at selectable positions along said predetermined path; and photoelectric means for sensing deviation of said target carrying device from said predetermined path and effective to correct said deviation to redirect said device onto said path automatically upon deviation of said device from said predetermined path.

23. A self-propelled wheel-supported target-carrying device responsive to photo-electrically induced signals and to sequential and predetermined automatically controlled switch action to traverse a predetermined path between a firing station and a target station to convey a target between said stations, said device comprising:

a target carrier movable between said stations in response to electrically regulated travel control means;

electric drive motor means responsive to control circuit means for propelling said carrier between said stations;

a source of electric energy supplying current to said drive motor means of said carrier and to electrical controls therefor;

target holding means supported on said target carrier;

a steering unit on said carrier for directing the path of travel of said carrier;

photo-electric control circuit means for controlling said steering unit of said target carrier and for controlling said drive motor means;

brake means for braking the movement of said target carrier at selectable positions along said predetermined path;

said brake means comprising a brake assembly for arresting the movement of a rotating drive shaft by imparting a frictional drag thereto, said brake assembly comprising:

a housing;

a brake shaft rotatably journalled within the housing;

a pulley sheath eccentrically mounted on the brake shaft for rotation therewith;

a pulley belt trained about the brake shaft and the drive shaft;

means positioning the pulley sheath in a stationary position of minimum tightness of the pulley belt with respect to the encompassed shafts whereby the loose pulley belt is rotated by the drive shaft about the stationary pulley sheath;

means positioning the pulley sheath in a stationary position of maximum tightness of the pulley belt with respect to the encompassed shafts whereby the tight pulley belt imparts a frictional drag unto the drive shaft so as to impede the rotation thereof; and photoelectric means for sensing deviation of said target carrying device from said predetermined path and effective to correct said deviation to redirect said device onto said path automatically upon deviation of said device from said predetermined path.

24. A brake as claimed in claim 23, and further comprising:

means for altering the position of the cantilever loaded levers whereby the lever arms may rotate past the impeding cantilever loaded levers comprising solenoid actuated plungers affixed to the cantilever loaded levers.

25. A brake as claimed in claim 23 wherein each of the means positioning the pulley sheath comprises lever arms extending from the brake shaft and cantilever loaded levers positioned on the housing on either side of the brake shaft for rotation with respect to the housing, such that the cantilever loaded levers impede the movement of the extending lever arms.

26. A brake is claimed in claim 23 and further comprising:

cantilever loaded cam follower levers positioned on the housing for rotation with respect thereto and microswitches adapted to be tripped by the cam follower levers, the cam followers being rotated so as to trip the microswitches when in contiguous contact with the extending lever arms of the brake shaft.

27. A self-propelled wheel-supported target-carrying device responsive to photo-electrically induced signals and to sequential and predetermined automatically controlled switch action to traverse a predetermined path between a firing station and a target station to convey a target between said stations, said device comprising:

a target carrier movable between said stations in response to electrically regulated travel control means;

electric drive motor means responsive to control circuit means for propelling said carrier between said stations;

a source of electric energy supplying current to said drive motor means of said carrier and to electrical controls therefor;

target holding means supported on said target carrier;

a steering unit on said carrier for directing the path of travel of said carrier;

photo-electric control circuit means for controlling said steering unit of said target carrier and for controlling said drive motor means;

brake means for braking the movement of said target carrier at selectable positions along said predetermined path;

said brake means comprising a brake and control assembly for arresting the movement of a rotating drive shaft by imparting a frictional drag thereto, said assembly comprising:

a housing;

a brake shaft rotatably journalled in the housing;

a pulley sheath eccentrically mounted on the brake shaft for rotation therewith;

a pulley belt trained about the brake shaft and the drive shaft;

a first fulcrum shaft positioned on the housing;

a second fulcrum shaft positioned on the housing;

a first and a second lever cantilever loaded for rotation on the first fulcrum shaft;

a third and a fourth lever cantilever loaded for rotation on the second fulcrum shaft;

a first brace means on the housing for limiting the rotation of the first and second levers about the first fulcrum shaft;

a second brace means for limiting the rotation of the third and fourth levers about the second fulcrum shaft;

a first lever arm extending from the brake shaft and perpendicular to the axis thereof;

a second lever arm extending from the brake shaft and perpendicular to the axis thereof, the second brake shaft being disposed at a 180° relationship with respect to the first lever arm;

the first lever arm being adapted to rotate past either the first or the third cantilever loaded levers and then to be locked in a fixed position from further rotation by the impedance of the first and the third cantilever loaded levers;

the second lever arm being adapted to rotate past either the second or the fourth cantilever loaded levers and then to be locked in a fixed position from further rotation by the impedance of the second and the fourth cantilever loaded levers;

means for altering the position of the cantilever loaded levers whereby the lever arms may rotate past the impeding cantilever loaded levers comprising solenoids having actuating plungers operatively connected to the cantilever loaded levers, whereby the brake shaft may be rotated to a position of minimum tightness of the pulley belt with respect to the encompassed pulley sheath and drive shaft such that the loose pulley belt is rotated by the drive shaft about the pulley sheath, the first lever arm being maintained in this position by the first and third cantilever loaded levers, and whereby the brake shaft may be rotated to a position of maximum tightness of the pulley belt with respect to the encompassed pulley sheath and drive shaft such that the tight pulley belt imparts a frictional drag unto the drive shaft so as to impede the rotation thereof, the second lever arm being maintained in this position by the second and fourth cantilever loaded levers;

means for selectively energizing the solenoids whereby the brake shaft cyclically rotates from the first said position to the second said position; and photoelectric means for sensing deviation of said target carrying device from said predetermined path and effective to correct said deviation to redirect said device onto said path automatically upon deviation of said device from said predetermined path.

28. A self-propelled wheel-supported target-carrying device responsive to photo-electrically induced signals and to sequential and predetermined automatically controlled switch action to traverse a predetermined path between a firing station and a target station to convey a target between said stations, said device comprising:

a target carrier movable between said stations in response to electrically regulated travel control means;
electric drive motor means responsive to control circuit means for propelling said carrier between said stations;
a source of electric energy supplying current to said drive motor means of said carrier and to electrical controls therefor;
target holding means supported on said target carrier;
a steering unit on said carrier for directing the path of travel of said carrier;
photo-electrically tripped signal circuitry adapted to be energized in response to a light variation signal and thereby to emit a circuit signal and comprising:
photosensitive bridge means;
first transistor switch means sensitive to the output potential of the photosensitive bridge means, whereby variations in the light incidence upon the photosensitive bridge means induces current flow through the said first transistor switch means;
second transistor switch means sensitive to current flow through the said first transistor switch means; and
third transistor switch means sensitive to current flow through the said second transistor switch means, the said second transistor switch means being self-lockingly energized by current flow through the said third transistor switch means,
whereby steady state output current flow through the said third transistor switch means effects the desired circuit signal;
photo-electric control circuit means for controlling said steering unit of said target carrier and for controlling said drive motor means;
brake means for braking the movement of said target carrier at selectable positions along said predetermined path; and
photoelectric means for sensing deviation of said target carrying device from said predetermined path and effective to correct said deviation to redirect said device onto said path automatically upon deviation of said device from said predetermined path.

29. A self-propelled wheel-supported target-carrying device responsive to photo-electrically induced signals and to sequential and predetermined automatically controlled switch action to traverse a predetermined path between a firing station and a target station to convey a target between said stations, said device comprising:

a target carrier movable between said stations in response to electrically regulated travel control means;
electric drive motor means responsive to control circuit means for propelling said carrier between said stations;
a source of electric energy supplying current to said drive motor means of said truck and to electrical controls therefor;
target holding means supported on said target carrier;
a steering unit on said carrier for directing the path of travel of said carrier;
photo-electric control circuit means for controlling said steering unit of said target carrier and for controlling said drive motor means;
a color coded tape defining said predetermined path for guiding said carrier therealong in response to light signals sent to and received from said tape;
front and rear wheels;
photosensitive means disposed rearwardly of said rear wheels and responsive to signal light reflected from said tape to provide control signals to said steering unit to maintain said device on said predetermined path during rearward movement of said device;
brake means for braking the movement of said target carrier at selectable positions along said predetermined path; and
photo-electric means for sensing deviation of said target carrying device from said path defined by said tape and effective to correct said deviation to redirect said device onto said path automatically upon deviation of said device from a path of travel defined by a center line of said tape.

References Cited by the Examiner

UNITED STATES PATENTS

| | | | |
|---|---|---|---|
| 2,074,251 | 3/1937 | Braun | 250—215 X |
| 2,209,158 | 7/1940 | Goldsmith | 250—215 X |
| 2,331,144 | 10/1943 | Sitter | 250—215 X |
| 2,339,291 | 1/1944 | Paulus et al. | 250—106 |
| 2,699,834 | 1/1955 | O'Brien | 250—106 |
| 2,726,870 | 12/1955 | Auger | 273—105.2 |
| 2,742,099 | 4/1956 | Hagen | 180—79.1 |
| 2,742,980 | 4/1956 | Carmichael | 188—77 |
| 2,776,364 | 1/1957 | Daniels | 250—206 |
| 2,787,748 | 4/1957 | Carlson | 318—257 |
| 2,804,945 | 9/1957 | Thierman | 188—77 |
| 2,809,297 | 10/1957 | Hartwig et al. | 250—214 |
| 2,908,854 | 10/1959 | Rice | 320—40 |
| 2,996,621 | 8/1961 | Barrett | 250—202 |
| 3,005,915 | 10/1961 | White et al. | 250—214 |
| 3,022,454 | 2/1962 | Millis | 318—257 |
| 3,039,004 | 6/1962 | Wilmotte | 250—210 |
| 3,073,999 | 1/1963 | Petrigalla | 320—40 |
| 3,086,121 | 4/1963 | Cockrell | 250—209 |
| 3,130,803 | 4/1963 | Wiggins | 180—79.1 |
| 3,104,323 | 9/1963 | Over et al. | 250—214 |

RALPH G. NILSON, *Primary Examiner.*

ARCHIE BORCHELT, *Examiner.*